(12) United States Patent  (10) Patent No.: US 8,670,674 B2
Takahara  (45) Date of Patent: Mar. 11, 2014

(54) OPTICAL TRANSMITTER AND METHOD FOR CONTROLLING THE SAME

(75) Inventor: Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 254 days.

(21) Appl. No.: 13/112,353

(22) Filed: May 20, 2011

(65) Prior Publication Data

US 2011/0293276 A1 Dec. 1, 2011

(30) Foreign Application Priority Data

May 26, 2010 (JP) ................................ 2010-120643

(51) Int. Cl.
*H04B 10/532* (2013.01)
(52) U.S. Cl.
USPC .......................................... 398/184; 188/197
(58) Field of Classification Search
USPC ........................................ 398/184, 188, 197
See application file for complete search history.

(56) References Cited

U.S. PATENT DOCUMENTS

| 2002/0003648 A1* | 1/2002 | Kobayashi et al. ........... 359/180 |
| 2005/0213975 A1* | 9/2005 | Gottwald et al. ............... 398/65 |
| 2006/0193640 A1 | 8/2006 | Katagiri et al. |
| 2007/0098415 A1* | 5/2007 | Lupo et al. .................... 398/197 |
| 2010/0054739 A1* | 3/2010 | Lavillonniere et al. ......... 398/67 |

FOREIGN PATENT DOCUMENTS

JP 2006-270909 10/2006

* cited by examiner

*Primary Examiner* — Nathan Curs
(74) *Attorney, Agent, or Firm* — Fujitsu Patent Center

(57) ABSTRACT

An optical transmitter includes: a first modulator that modulates a first optical signal with a first data signal; a second modulator that modulates a second optical signal with a second data signal; a multiplexer that multiplexes the first optical signal and the modulated second optical signal to output a multiplexed signal; a phase difference data generator that generates a phase difference signal corresponding to a phase difference between the modulated first optical signal and the modulated second optical signal from the multiplexed signal; and a controller that controls the phase difference between the modulated first optical signal and the modulated second optical signal based on the phase difference signal.

14 Claims, 15 Drawing Sheets

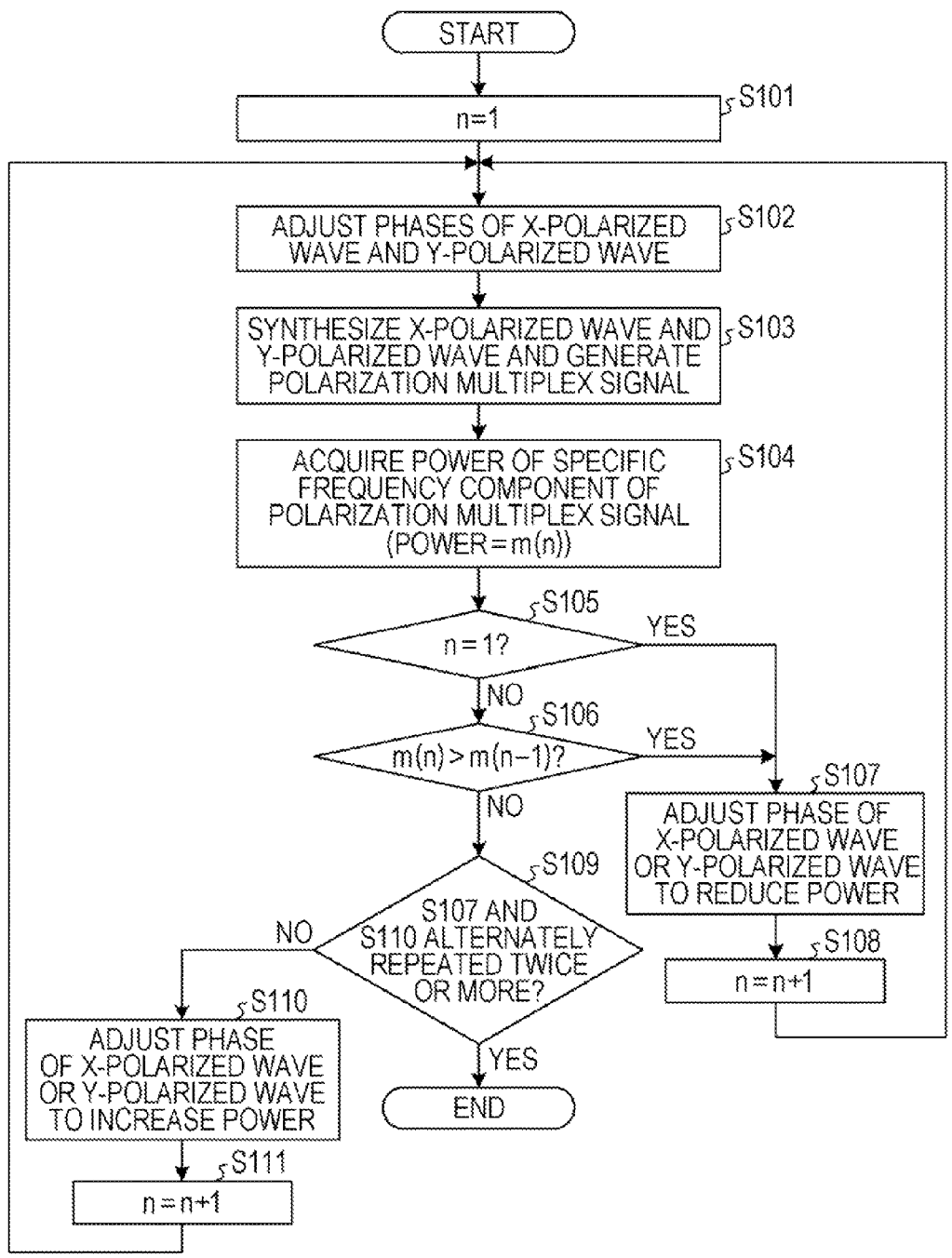

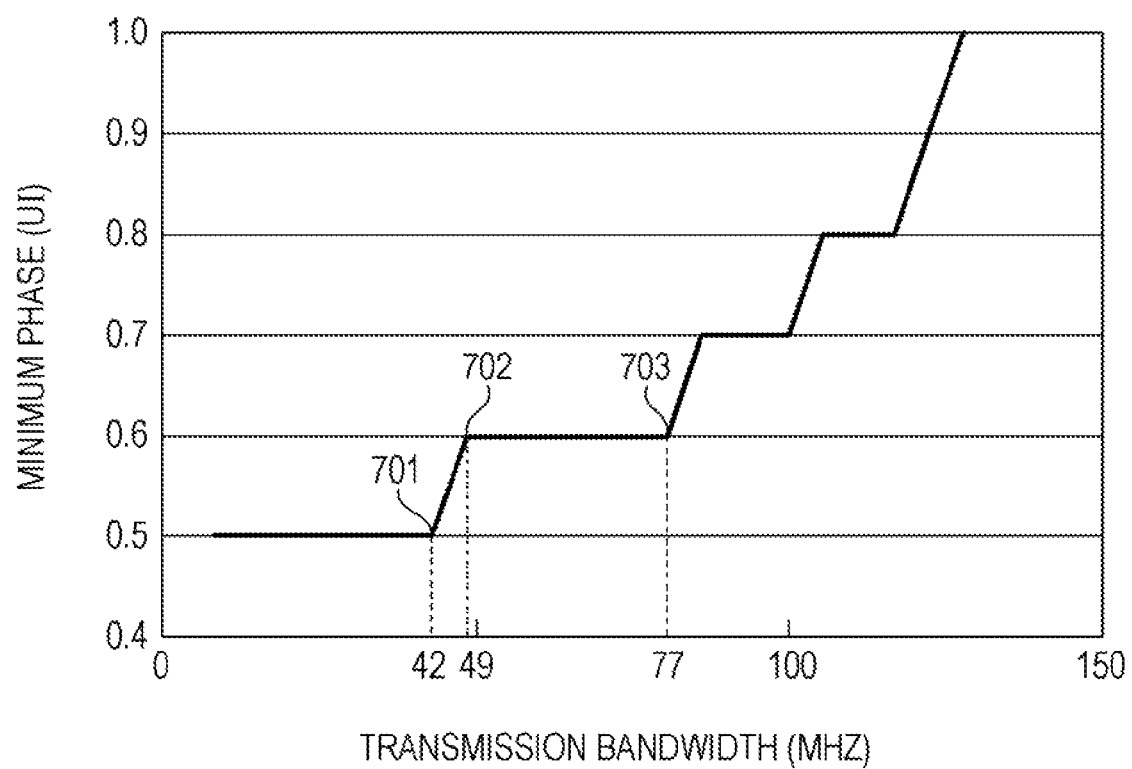

OPTICAL TRANSMITTER AND METHOD FOR CONTROLLING THE SAME

CROSS-REFERENCE TO RELATED APPLICATION

This application is based upon and claims the benefit of priority from the prior Japanese Patent Application No. 2010-120643 filed on May 26, 2010, the entire contents of which are incorporated herein by reference.

FIELD

The embodiment discussed herein is related to an optical transmitter and a method for controlling the same.

BACKGROUND

Phase modulation has been in practical use as one of the techniques to transmit signals in an optical transmission system. In the phase modulation, data is transmitted by controlling the phase of a carrier wave in accordance with the transmission data. For example, in quadrature phase-shift keying (QPSK) modulation, "θ", "θ+π/2," "θ+π" and "θ+3π/2" are assigned respectively to each symbol "00," "10", "11" and "01", each of which consists of 2-bit data. Here, "θ" is an arbitrary phase. A receiver device reproduces transmission data by detecting the phase of the received signals.

Differential quadrature phase-shift keying (DQPSK) is known as a technique to relatively easily implement a QPSK receiver. In the DQPSK modulation, the difference between two successive symbols is assigned with the corresponding phase (0, π/2, π, 3π/2). Accordingly, the receiver device may reproduce the transmission data by detecting the phase difference between the two successive symbols.

FIG. 17 illustrates a related art QPSK transmitter. Here, only a configuration necessary for the description of the operation principle will be illustrated. A QPSK optical modulator 900 is a Mach-Zehnder modulator, which is provided with an optical continuous wave (CW) generated by an optical source (not illustrated). The optical CW is split by an optical splitter, and is guided to a first arm and a second arm. The first arm is provided with a modulator 901 and the second arm is provided with a modulator 902. Signals which passing through the modulator 901 are provided with delays T1 and T2 by a driver 910. Signals which passing through the modulator 902 are provided with delays T3 and T4 by the driver 910. Here, the signals input to the modulator 901 are referred to as an x-polarized wave and the signals input to the modulator 902 are referred to as a y-polarized wave. FIG. 18 illustrates the x-polarized wave and the y-polarized wave. In FIG. 18, a wave 921 is the x-polarized wave and a wave 922 is the y-polarized wave. As illustrated in FIG. 18, the x-polarized wave and the y-polarized waves are two optical waves with mutually orthogonal polarization states. A set of optical signals output from the modulators 901 and 902 are combined to generate DQPSK signals which are the polarization multiplex signals.

In such an optical transmitter which processes a plurality of signals in a multiplexed manner, it is important to precisely control the delay differences among the multiplex signals. Here, the phase difference between the data streams of the x-polarized wave and the y-polarized wave is defined in two ways in the transmission scheme thereof. In the following description, the phase difference between the data streams of the x-polarized wave and the y-polarized wave may be simply referred to as the "phase difference between the x-polarized wave and the y-polarized wave." Here, the phase difference between the x-polarized wave and the y-polarized wave is represented by, for example, ΔT in FIG. 18. In one of the phase difference types, the data streams of the x-polarized wave and the y-polarized wave are in the same phase, i.e., are in an "aligned" state. In the aligned state, the data streams of the x-polarized wave and the y-polarized wave are provided with no phase difference (i.e., a delay difference). In the other of the phase difference types, the data streams of the x-polarized wave and the y-polarized wave are provided with half a bit of the phase difference (i.e., the delay difference), i.e., are in an "interleaved" state. The phase difference ΔT in FIG. 18 represents the interleaved state. That is, in the optical transmitter, it is important to precisely adjust the phase difference between the x-polarized wave and the y-polarized wave in the aligned or the interleaved state. Since whether to select the aligned or the interleaved state is determined in accordance with a system request, it is preferable that the signals are transmittable in either transmission scheme, i.e., in the aligned state or the interleaved state.

In this regard, a related art technique to perform a phase adjustment of the x-polarized wave and the y-polarized wave with a combination of a fixed delay modulator, a driver which provides a fixed delay, and a phase shifter which provides a phase difference in a preceding stage of the fixed delay modulator has been proposed. Another technique for the retiming of each data string with synchronized clocks has also been proposed. A further technique to perform delay control by providing a variable delay circuit for each data string has been proposed. A further technique to perform a phase adjustment with a variable operation circuit provided for each data string and a differential amplifier provided in the final stage has also been proposed.

The following is a reference document.
[Document 1]: Japanese Laid-Open Patent Publication No. 2006-270909

SUMMARY

According to an aspect of the embodiment, an optical transmitter includes: a first modulator that modulates a first optical signal with a first data signal; a second modulator that modulates a second optical signal with a second data signal; a multiplexer that multiplexes the first optical signal and the modulated second optical signal to output a multiplexed signal; a phase difference data generator that generates a phase difference signal corresponding to a phase difference between the modulated first optical signal and the modulated second optical signal from the multiplexed signal; and a controller that controls the phase difference between the modulated first optical signal and the modulated second optical signal based on the phase difference signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flowchart of a phase difference adjustment in an optical transmitter according to the second embodiment;

FIG. 14 is a graph illustrating a relationship between the transmission bandwidth and the phase difference;

DESCRIPTION OF EMBODIMENTS

Hereinafter, embodiments of an optical transmitter and a method for controlling the same disclosed in the present application will be described in detail with reference to the drawings. The embodiments of the optical transmitter and the method for controlling the same disclosed in the present application are illustrative only and not limiting.

First Embodiment

Figure 1:
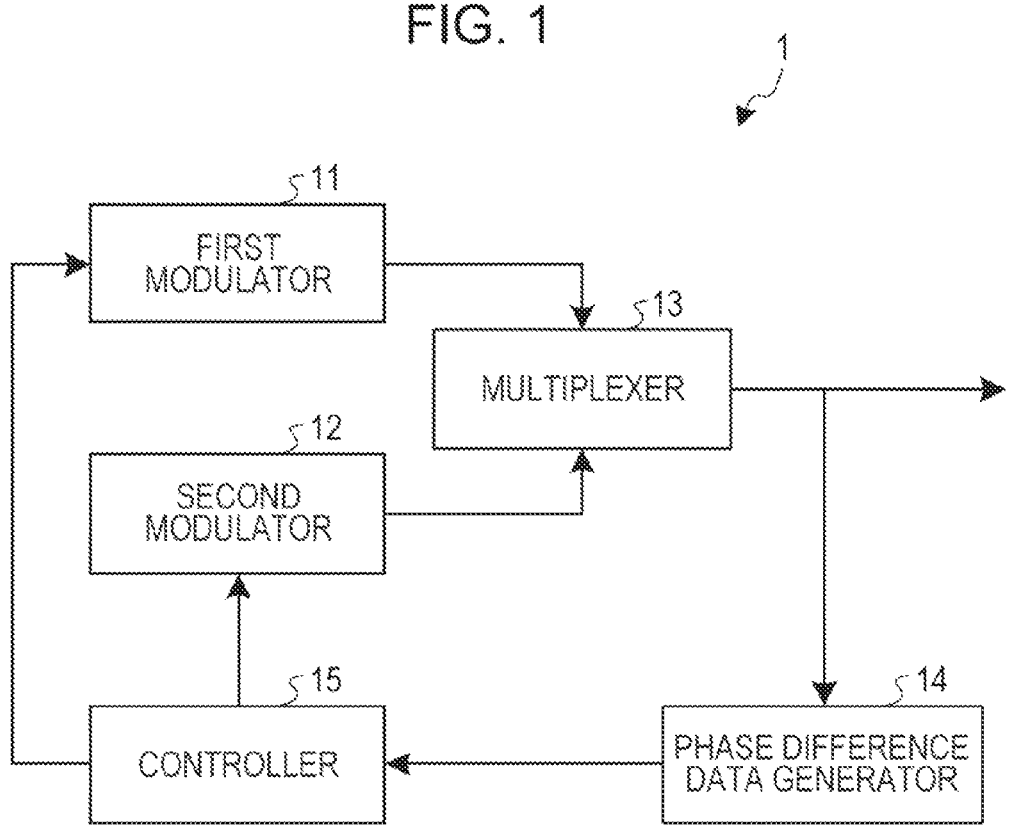
FIG. 1 is a block diagram of an optical transmitter according to a first embodiment.

FIG. 1 is a block diagram of an optical transmitter according to a first embodiment. An optical transmitter 1 according to the first embodiment includes a first modulator 11, a second modulator 12, a multiplexer 13, a phase difference data generator 14 and a controller 15.

Two optical signals are input to each of the first modulator 11 and the second modulator 12.

The first modulator 11 receives the input of the optical signals. The first modulator 11 performs a phase adjustment of optical signals under the control of the controller 15. The first modulator 11 supplies the phase-adjusted optical signals to the multiplexer 13.

The second modulator 12 receives the input of the optical signals. The second modulator 12 performs a phase adjustment of the optical signals under the control of the controller 15. The second modulator 12 supplies the phase-adjusted optical signals to the multiplexer 13.

The multiplexer 13 receives the supply of the optical signals from the first modulator 11. The multiplexer 13 receives the supply of the optical signals from the second modulator 12. The multiplexer 13 multiplexes the optical signals received from the first modulator 11 and the second modulator 12 and generates multiplex signals. The multiplexer 13 outputs the generated multiplex signals. The multiplex signals output from the multiplexer 13 are split; one of the split components is directed to an external optical receiver (not illustrated) and the other is directed to the phase difference data generator 14.

The phase difference data generator 14 acquires the multiplex signals output from the multiplexer 13. Using the multiplex signals, the phase difference data generator 14 generates phase difference data which corresponds to the phase difference between the signals output from the first modulator 11 and the signals output from the second modulator 12. The phase difference data generator 14 outputs the phase difference data to the controller 15.

The controller 15 receives the input of the phase difference data from the phase difference data generator 14. The controller 15 controls the phase adjustment of the optical signals in the first modulator 11 and the second modulator 12 using the phase difference data. For example, the controller 15 may comprise a circuit, Field-Programmable Gate Array (FPGA), or a processor.

As described above, the optical transmitter according to the first embodiment obtains the phase difference among the optical signals using the output multiplex signals and then performs the phase adjustment of the optical signals in accordance with the phase difference. That is, the optical transmitter according to the first embodiment performs feedback control using the output multiplex signals. This allows the optical transmitter according to the first embodiment to precisely adjust the phase difference among the optical signals included in the multiplex signals. The phase adjustment performed by the optical transmitter according to the first embodiment may be achieved by either the transmission scheme, i.e., in the aligned state or the interleaved state.

Second Embodiment

Figure 2:
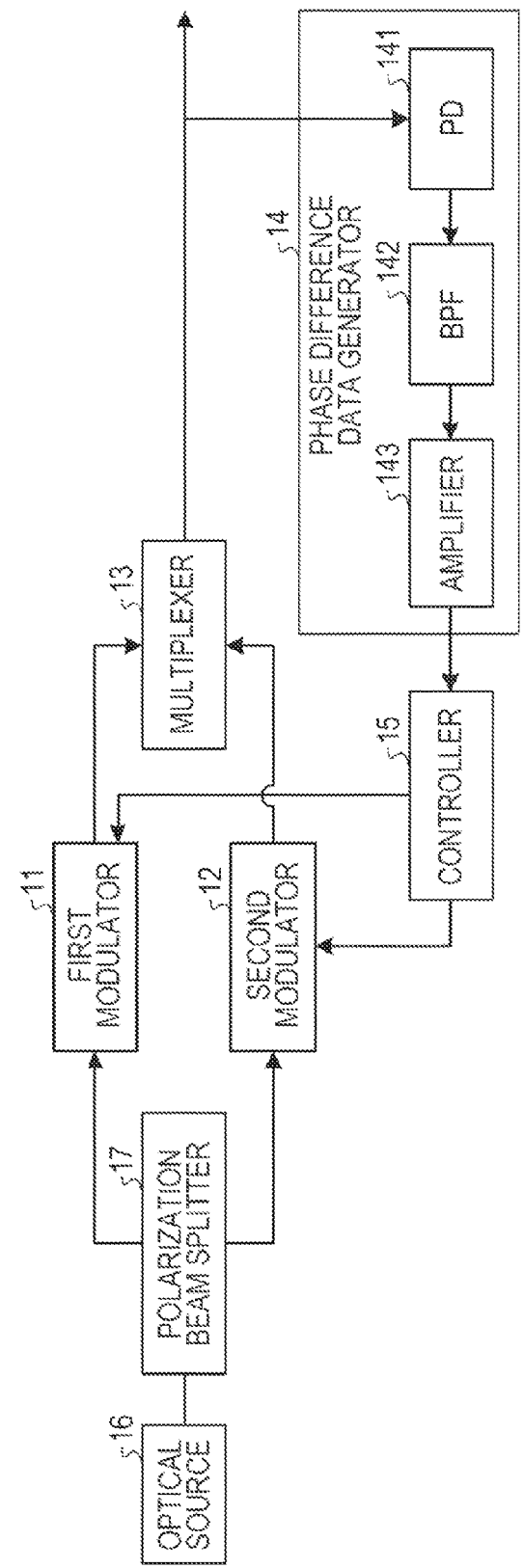
FIG. 2 is a block diagram of an optical transmitter according to a second embodiment.

FIG. 2 is a block diagram of an optical transmitter according to a second embodiment. An optical transmitter 1 according to the second embodiment includes a first modulator 11, a second modulator 12, a multiplexer 13, a phase difference data generator 14, a controller 15, an optical source 16 and a polarization beam splitter 17. In the second embodiment, the optical transmitter 1 will be described as a device which performs data transmission in the QPSK scheme.

The optical source 16 produces continuous wave light or an optical pulse train of necessary wavelength. The optical source 16 outputs the produced light to the polarization beam splitter 17.

The polarization beam splitter 17 splits the light output from the optical source 16 into two components with mutually orthogonal polarization states. Hereinafter, one of the two components with mutually orthogonal polarization states is sometimes referred to as an x-polarized wave and the other as a y-polarized wave. The polarization beam splitter 17 outputs one of the components (i.e., the x-polarized wave) to the first modulator 11. The polarization beam splitter 17 outputs the other of the components (i.e., the y-polarized wave) to the second modulator 12.

The first modulator 11 receives the input of the x-polarized wave from the polarization beam splitter 17. Here, the x-polarized wave is input while keeping its polarization state. The first modulator 11 further splits the x-polarized wave into two optical signals. The first modulator 11 receives the data signals for the two split optical signals from the controller 15. The first modulator 11 performs a phase adjustment to each of the two split optical signals in accordance with the data signals. The first modulator 11 multiplexes the two phase-adjusted optical signals and supplies the multiplexed optical signals to the multiplexer 13.

The second modulator 12 receives the input of the y-polarized wave from the polarization beam splitter 17. Here, the x-polarized wave is input while keeping its polarization state. The second modulator 12 further splits the y-polarized wave into two optical signals. The second modulator 12 receives the data signals for the two split optical signals from the controller 15. The second modulator 12 performs a phase adjustment to each of the two split optical signals in accordance with the data signals. The second modulator 12 multiplexes the two phase-adjusted optical signals and supplies the multiplexed optical signals to the multiplexer 13.

The multiplexer 13 receives the supply of the x-polarized wave from the first modulator 11. The multiplexer 13 receives the supply of the y-polarized wave from the second modulator 12. The multiplexer 13 synthesizes the x-polarized wave and the y-polarized wave with mutually orthogonal polarization states into one and generates polarization multiplex signals. The multiplexer 13 transmits the generated polarization multiplex signal to an optical transmission line.

Each of the polarization multiplex signals transmitted to the optical transmission line is split into two; one of the split components directed to an optical receiver (not illustrated) and the other is directed to the phase difference data generator 14.

The phase difference data generator 14 includes a photo diode (PD) 141 or a photo detector, a band pass filter (BPF) 142 and an amplifier 143.

The photodiode 141 converts the polarization multiplex signals which are optical signals input from the multiplexer 13 into electrical signals.

The band pass filter 142 is previously provided with a predetermined center frequency and a predetermined transmission bandwidth. A method for determining the center frequency and the transmission bandwidth provided to the band pass filter 142 will be described in detail later.

The band pass filter 142 receives the input of the polarization multiplex signals which have been converted into the electrical signals by the photodiode 141. The band pass filter 142 extracts, from among the input electrical signals, an electrical signal of a frequency included in conditions of a combination of the predetermined center frequency and the predetermined transmission bandwidth as phase difference data. Hereinafter, this extracted electrical signal will be called a "specific frequency component." The band pass filter 142 outputs the specific frequency component to the amplifier 143.

The amplifier 143 receives the input of the specific frequency component from the band pass filter 142. The amplifier 143 amplifies the power of the specific frequency component. The amplifier 143 outputs the amplified specific frequency component to the controller 15.

The controller 15 receives the input of the data signals. The controller 15 receives the input of the specific frequency component from the amplifier 143. The controller 15 adjusts the phase of each data signals using the specific frequency component, and performs feedback control so that the phase difference between the x-polarized wave from the first modulator 11 and the y-polarized wave from the second modulator 12 becomes a predetermined value. Details of the feedback control will be described later. In this manner, the controller 15 controls the phase adjustment of the x-polarized wave in the first modulator 11 and the phase adjustment of the y-polarized wave in the second modulator 12. For example, the controller 15 may comprise a circuit, Field-Programmable Gate Array (FPGA), or a processor.

Figure 4:
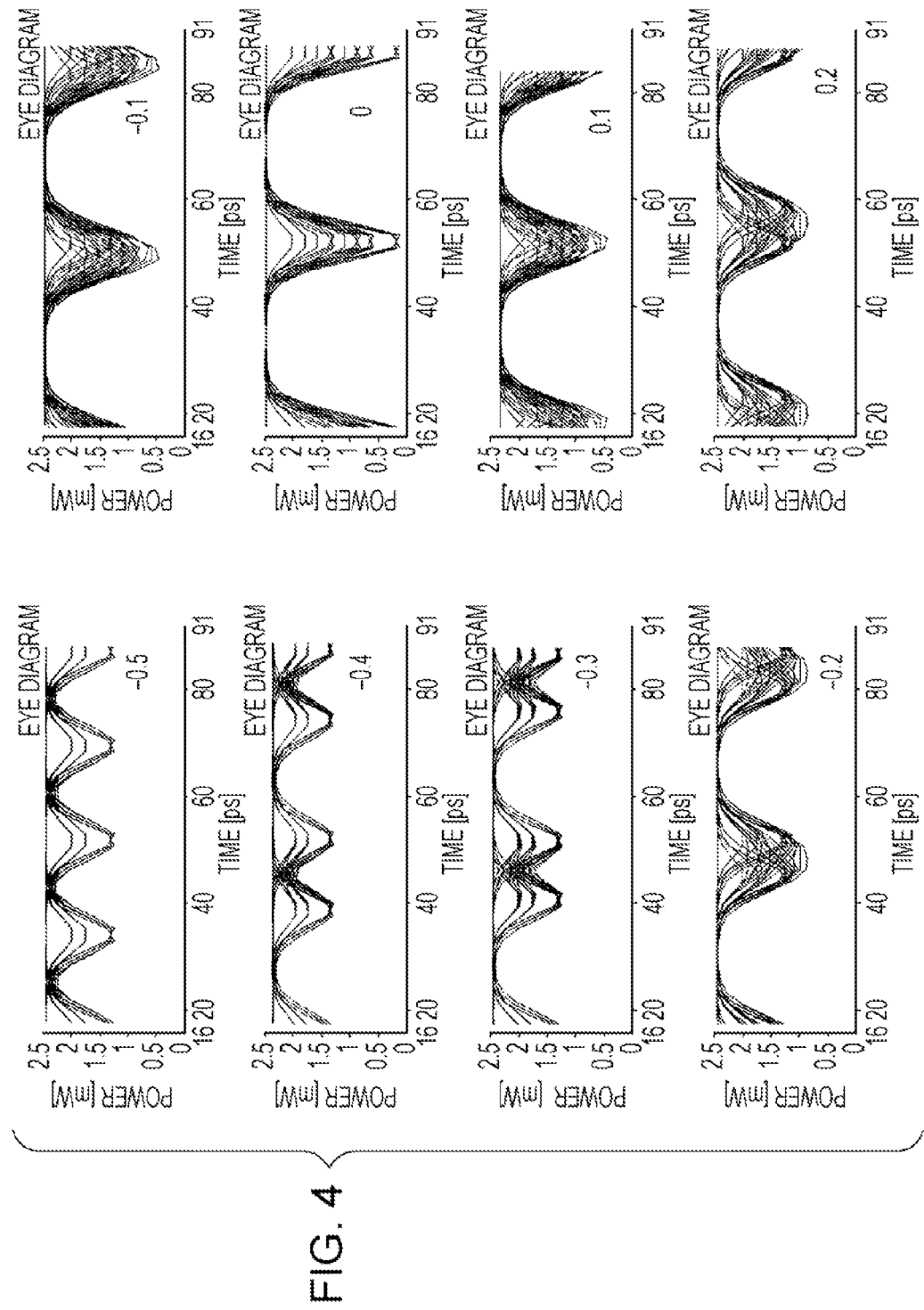
FIG. 4 illustrates exemplary output waveforms of polarization multiplex signals with various phase differences.
Figure 5:
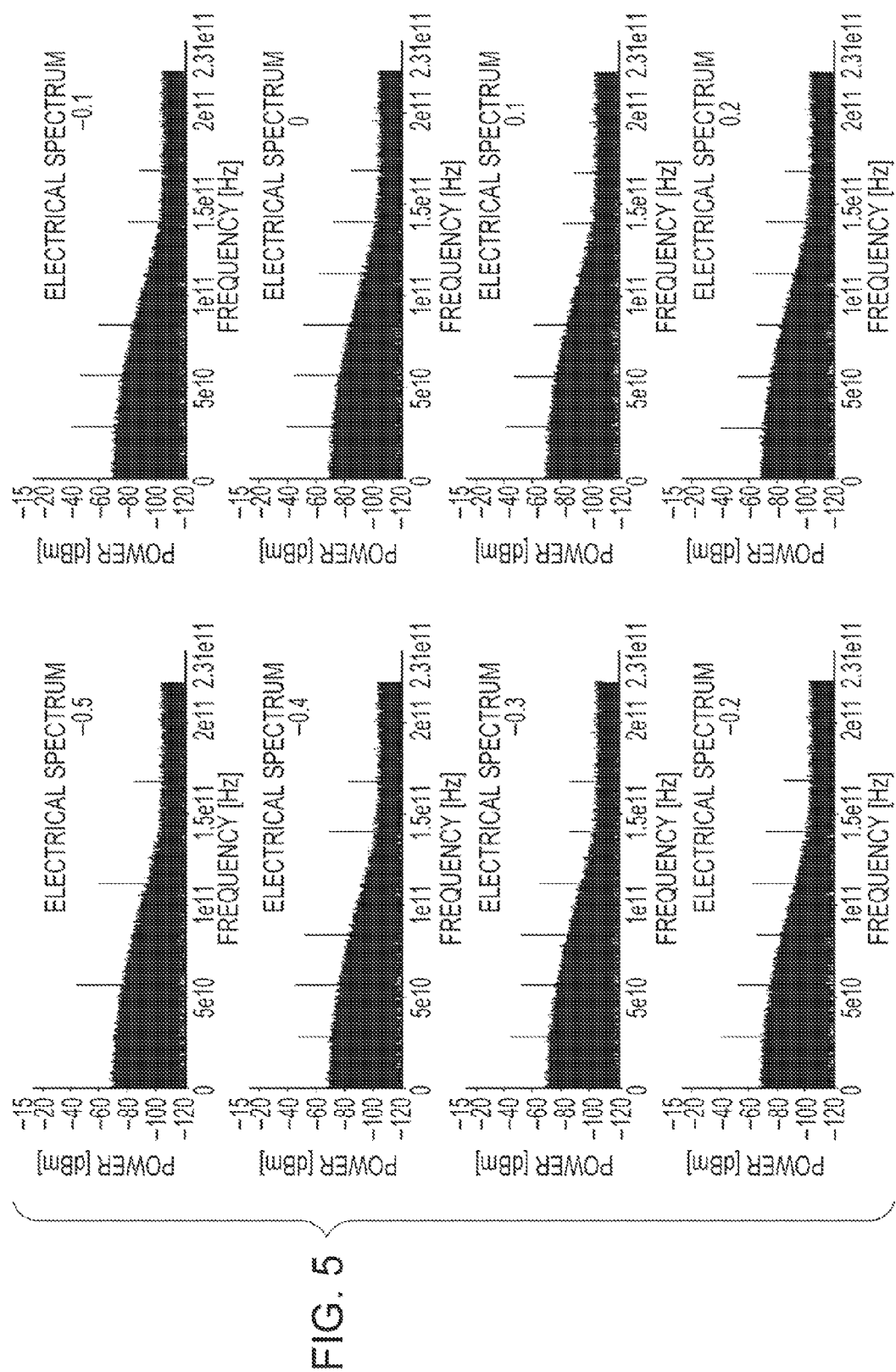
FIG. 5 illustrates exemplary output spectra corresponding to the output waveforms of FIG. 4.
Figure 6:
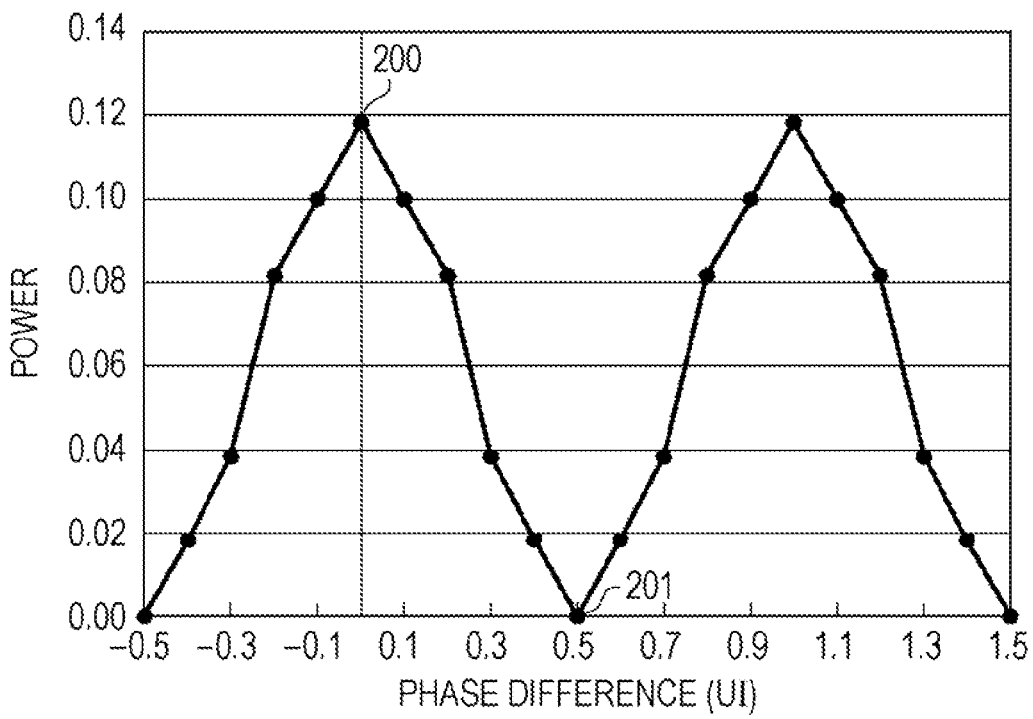
FIG. 6 is a graph illustrating a relationship between the phase difference and the power of the specific frequency when a band pass filter (BPF) which is 28 GHz in the center frequency and 100 MHz in the transmission bandwidth is used.
Figure 7:
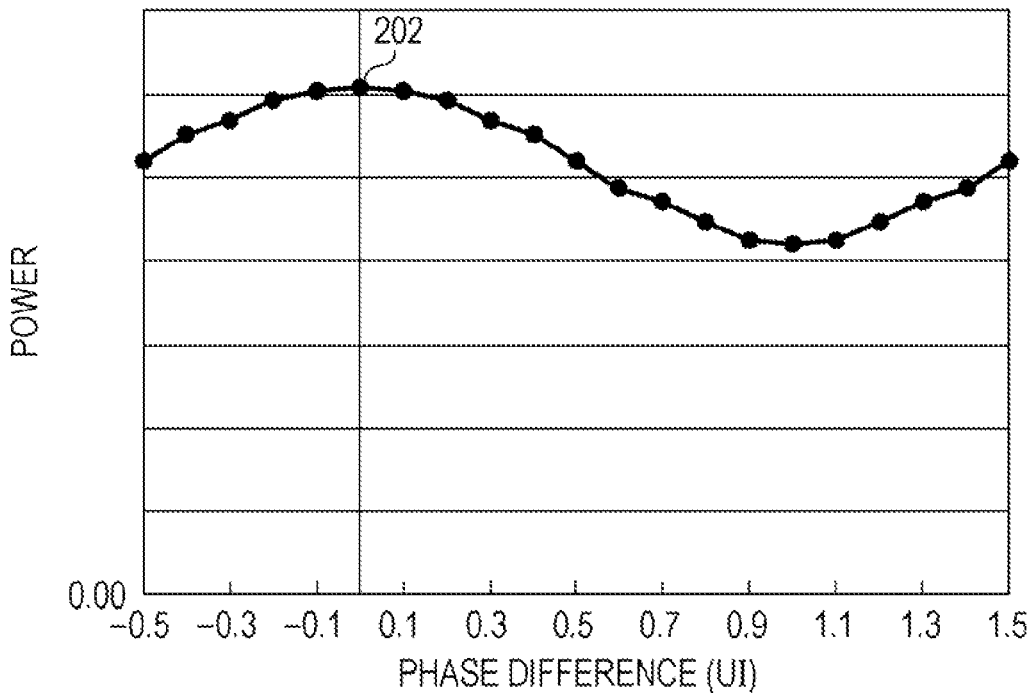
FIG. 7 is a graph illustrating a relationship between the phase difference and the power of the specific frequency when a BPF which is 14 GHz in the center frequency and 100 MHz in the transmission bandwidth is used.
Figure 8:
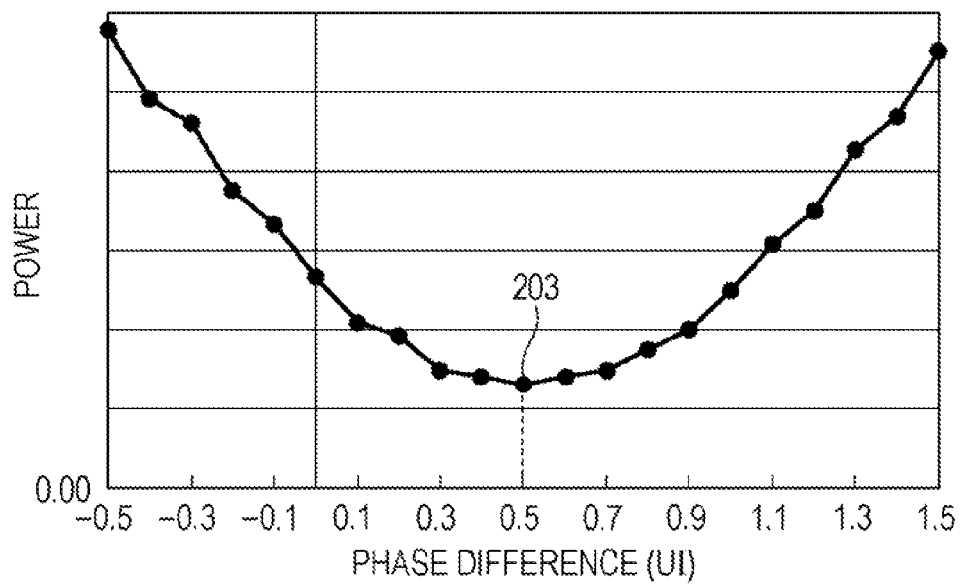
FIG. 8 is a graph illustrating a relationship between the phase difference and the power of the specific frequency when a BPF which is 7 GHz in the center frequency and 30.8 MHz in the transmission bandwidth is used.
Figure 9:
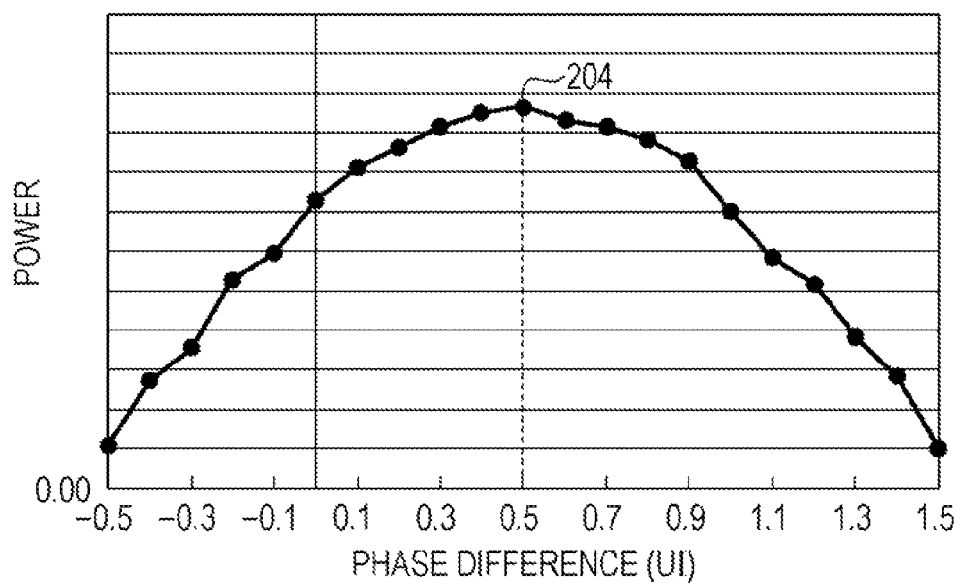
FIG. 9 is a graph illustrating a relationship between the phase difference and the power of the specific frequency when a BPF which is 3.5 GHz in the center frequency and 105 MHz in the transmission bandwidth is used.

Here, the feedback control by the controller 15 will be described with reference to FIGS. 4 to 9. FIG. 4 illustrates exemplary output waveforms of polarization multiplex signals with various phase differences. FIG. 5 illustrates exemplary output spectra corresponding to the output waveforms of FIG. 4. FIG. 6 is a graph illustrating a relationship between the phase difference and the power of the specific frequency when a BPF which is 28 GHz in the center frequency and 100 MHz in the transmission bandwidth is used. FIG. 7 is a graph illustrating a relationship between the phase difference and the power of the specific frequency when a BPF which is 14 GHz in the center frequency and 100 MHz in the transmission bandwidth is used. FIG. 8 is a graph illustrating a relationship between the phase difference and the power of the specific frequency when a BPF which is 7 GHz in the center frequency and 30.8 MHz in the transmission bandwidth is used. FIG. 9 is a graph illustrating a relationship between the phase difference and the power of the specific frequency when a BPF which is 3.5 GHz in the center frequency and 105 MHz in the transmission bandwidth is used.

Each graph in FIG. 4 illustrates an output waveform of the polarization multiplex signal in which the x-polarized wave and the y-polarized wave have a phase difference at the unit interval (UI) specified in the graphs. Time is represented in the horizontal axis and the power is represented in the vertical axis in each graph in FIG. 4. Each graph in FIG. 5 illustrates an output spectrum corresponding to each graph in FIG. 4. The frequency is represented in the horizontal axis and the power is represented in the vertical axis in each graph in FIG. 5. As illustrated in FIGS. 4 and 5, as the phase difference of the x-polarized wave and the y-polarized wave becomes large, the power of 28-GHz component decreases, for example. Here, when the main part of the data is to be transmitted at the transmission rate of 25 Gbits, a transmission rate of 28 Gbps is actually required to include an error code. When the transmission rate is α Gbps, a change in the power in the component of the frequency of α GHz becomes the maximum. Accordingly, when the main part of the data is to be transmitted at the transmission rate of 25 Gbits, the change in the power becomes the largest in the 28-GHz component. Here, focusing attention on, for example, the 28-GHz frequency component, the change in the phase difference and the power at the frequency of 28 GHz is measured. That is, the change in the power of the specific frequency which has passed the band pass filter 142 which is 28 GHz in the center frequency and 100 MHz in the transmission bandwidth is measured.

The measurement result is given in FIG. 6. FIG. 6 is a graph in which the phase difference (UI) is represented in the horizontal axis and the power is represented in the vertical axis. As illustrated by a point 200 in FIG. 6, the power becomes the maximum when the phase difference is 0 (UI). As illustrated by a point 201, the power becomes the minimum when the phase difference is 0.5 (UI). That is, when, for example, a band pass filter which is 28 GHz in the center frequency and 100 MHz in the transmission bandwidth is used as the band pass filter 142, the x-polarized wave and the y-polarized wave are in the same phase when the power becomes the maximum. Here, the x-polarized wave and the y-polarized wave are in the aligned state. When the power becomes the minimum, half a bit of the phase difference occurs between the x-polarized wave and the y-polarized wave. Here, the x-polarized wave and the y-polarized wave are in the interleaved state.

Here, the power is lowered as the phase difference becomes large with the frequency of 28 GHz; however, the power may be increased as the phase difference becomes large in some frequency components. Now, the measurement results of the power regarding some other frequency components will be described.

Another example is given in the graph of FIG. 7. FIG. 7 illustrates the change in the power of the specific frequency which has passed the band pass filter 142 which is 14 GHz in the center frequency and 100 MHz in the transmission bandwidth. Here, the center frequency of 14 GHz is the center frequency corresponding to a value equivalent to one half of the transmission rate of 28 Gbits. As illustrated by a point 202 in FIG. 7, the power becomes the maximum when the phase difference is 0 (UI). That is, when, for example, a band pass filter which is 28 GHz in the center frequency and 100 MHz in the transmission bandwidth is used as the band pass filter 142, the x-polarized wave and the y-polarized wave are in the same phase when the power becomes the maximum. Here, the x-polarized wave and the y-polarized wave are in the aligned state.

Another example is given in the graph of FIG. 8. FIG. 8 illustrates the change in the power of the specific frequency which has passed the band pass filter 142 which is 7 GHz in the center frequency and 30.8 MHz in the transmission bandwidth. Here, the center frequency of 7 GHz is the center frequency corresponding to a value equivalent to one fourth of the transmission rate of 28 Gbits. As illustrated by a point 203 in FIG. 8, the power becomes the minimum when the phase difference is 0.5 (UI). That is, when, for example, a band pass filter which is 28 GHz in the center frequency and 100 MHz in the transmission bandwidth is used as the band pass filter 142, half a bit of phase difference occurs between the x-polarized wave and the y-polarized wave where the power becomes the minimum. Here, the x-polarized wave and the y-polarized wave are in the interleaved state.

Another example is given in the graph of FIG. 9. FIG. 9 illustrates the change in the power of the specific frequency which has passed the band pass filter 142 which is 3.5 GHz in the center frequency and 105 MHz in the transmission bandwidth. Here, the center frequency of 3.5 GHz is the center frequency corresponding to a value equivalent to one eighth of the transmission rate of 28 Gbits. As illustrated by a point 204 in FIG. 9, the power becomes the maximum when the phase difference is 0.5 (UI). That is, when, for example, a band pass filter which is 28 GHz in the center frequency and 100 MHz in the transmission bandwidth is used as the band pass filter 142, half a bit of phase difference occurs between the x-polarized wave and the y-polarized wave where the power becomes the maximum. Here, the x-polarized wave and the y-polarized wave are in the interleaved state.

The x-polarized wave and the y-polarized wave are in the aligned or the interleaved state depending on the state in which the power becomes the maximum or the minimum in accordance with the combination of the center frequency and the transmission bandwidth set for the band pass filter 142 to be used. That is, the operational setting of the controller 15 may be determined by properly setting the values of the center frequency and the transmission bandwidth of the band pass filter 142.

Figure 3:
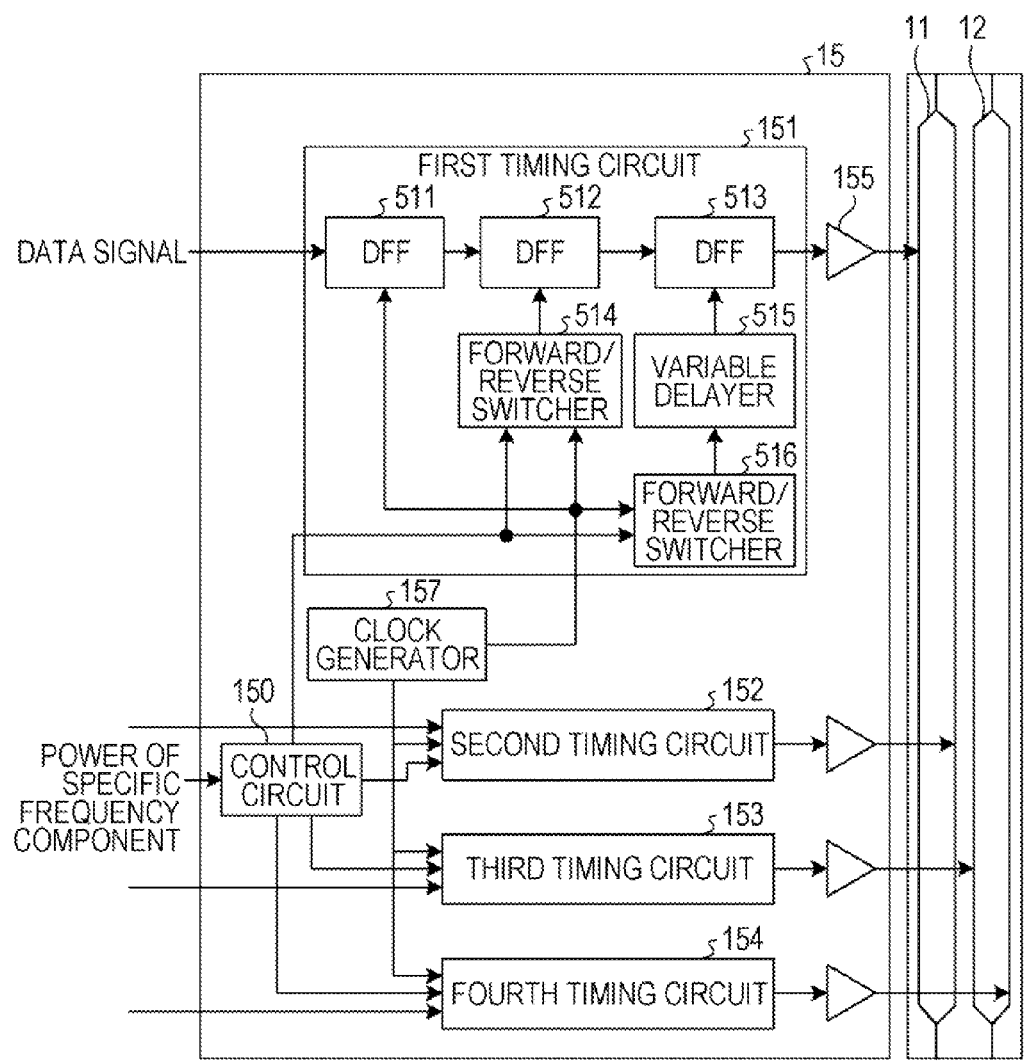
FIG. 3 is a block diagram of a controller according to the second embodiment.

Next, the controller 15 will be described in further detail with reference to FIG. 3 on the basis of the relationship between the power of the specific frequency component and the phase difference between the x-polarized wave and the y-polarized wave. FIG. 3 is a block diagram of a controller according to the second embodiment. As illustrated in FIG. 3, the controller 15 includes a control circuit 150, a first timing circuit 151, a second timing circuit 152, a third timing circuit 153, a fourth timing circuit 154, an amplifier 155 and a clock generator 157. Here, the band pass filter 142 which is 28 GHz in the center frequency and 100 MHz in the transmission bandwidth is used.

It is previously determined whether to specify the maximum value or the minimum value of the power in the specific frequency component for the control circuit 150. Whether to specify the maximum value or the minimum value is determined by the setting of the band pass filter 142 and a request as to whether the phase is desirably set to the aligned or the interleaved state. Here, supposing that the phase is desirably set to the aligned state using the band pass filter 142 which is 28 GHz in the center frequency and 100 MHz in the transmission bandwidth. That is, supposing that the control circuit 150 has been set so as to specify the maximum of the power.

The control circuit 150 acquires the power of the specific frequency component input from the amplifier 143. Here, the control circuit 150 acquires the power of the 28-GHz frequency component. The control circuit 150 specifies the maximum value of the power. The control circuit 150 performs feedback control of the relative phase between the data signals and clock signals such that the power of the specific frequency component becomes the maximum. In particular, the control circuit 150 compares the power of the specific frequency component of the signals under the current control and the power of the specific frequency component of the signals under the previous control and when the current power is larger than the previous power, provides the x-polarized wave or the y-polarized wave with the phase difference such that the power of the specific frequency component becomes small. On the contrary, when the current power is smaller than the previous power, the control circuit 150 provides the x-polarized wave or the y-polarized wave with the phase difference such that the power of the specific frequency component becomes large.

The control circuit 150 completes the feedback control when the predetermined conditions are fulfilled. The predetermined conditions are, for example in the present embodiment, those in which provision of the phase difference to the x-polarized wave or the y-polarized wave to increase the power and provision of the phase difference to the x-polarized wave or the y-polarized wave to increase the power are repeated alternately a predetermined number of times. In the above description, the feedback control is completed when the predetermined conditions are fulfilled in the present embodiment; however, the control circuit 150 may continuously perform the feedback control while the optical transmitter 1 is performing the optical transmission.

The detailed description will be given with reference to a configuration for providing the phase difference in the unit of 0.25 UI. In this case, the control circuit 150 provides the phase difference stepwise in the unit of 0.25 UI in the feedback control. The control circuit 150 controls the first timing circuit 151 to the fourth timing circuit 154 such that the phase differences of 0 UI, 0.25 UI, 0.5 UI or 0.75 UI are provided as the phase difference to each of the data signals. The phase differences provided by the control circuit 150 includes the phase difference in the interleaved state. For example, when the phase difference of 0.25 UI is provided additionally to a signal with a delayed phase in the interleaved state, the control circuit 150 provides the phase difference of 0.75 UI to the signal. In the present embodiment, the control is made in the unit of 0.25 UI; however, the unit of the phase difference which may be provided is determined in accordance with the number of DDFs to be disposed, the phase margin of the DDFs and the performance of components, such as a variable delay device. If a larger number of the DDFs, a wider phase margin of the DDF and the components, such as a variable delay device, of higher performance are used, the phase difference which may be provided may be setup in smaller units. Setting up of the phase difference which may be provided in smaller units allows a more precise phase adjustment of the x-polarized wave and the y-polarized wave.

In the present embodiment, the first timing circuit 151 to the fourth timing circuit 154 are controlled such that the power of the 25-GHz frequency component of the polarization multiplex signal output from the multiplexer 13 is the same as that at the point 200 of FIG. 6.

Here, the maximum value is used to let the x-polarized wave and the y-polarized wave be in the aligned state; but the minimum value is used to let the x-polarized wave and the y-polarized wave be in the interleaved state. In that case, the control circuit 150 controls the first timing circuit 151 to the fourth timing circuit 154 such that the power of the 25-GHz frequency component of the polarization multiplex signal output from the multiplexer 13 is the same as that at the point 201 of FIG. 6.

The clock generator 157 generates clocks. The clock generator 157 outputs the generated clocks to the first timing circuit 151 to the fourth timing circuit 154.

The first timing circuit 151, the second timing circuit 152, the third timing circuit 153 and the fourth timing circuit 154 are the same in configuration. Thus, the first timing circuit 151 will be described. The second timing circuit 152, the third timing circuit 153 and the fourth timing circuit 154 also have the configuration and the operation in the following description.

The first timing circuit 152 includes a D-type flip flop (DFF) 511, a DFF 512, a DFF 513, a forward/reverse switcher 514, a variable delayer 515 and a forward/reverse switcher 516.

The DFF 511 receives the input of the data signals. The DFF 511 receives the input of the clocks from the clock generator 157. The DFF 511 performs retiming of the data signals at rising edges of predetermined clocks. It suffices that the predetermined clocks herein are the clocks which are the same in timing in the first timing circuit 151 to the fourth timing circuit 154. The DFF 511 outputs the phase-adjusted data signals to the DFF 512.

The forward/reverse switcher 514 receives the input from the clock generator 157. If the phase difference designated by the control circuit 150 is 0, the forward/reverse switcher 514 performs the forward switching of the first clock and outputs the clock to the DFF 512. Here, the term "forward switching" also includes keeping the state of the clock. If the phase difference designated by the control circuit 150 is 0.5, the control circuit 150 performs the reverse switching of the clock and outputs the clock to the DFF 512.

The DFF 512 receives, from the DFF 511, the input of the data signals which are subject to retiming at the rising edges of the clocks. The DFF 512 receives the input of the clocks from the forward/reverse switcher 514. The DFF 512 performs retiming of the data signals at rising edges of the input clocks. The DFF 512 transmits the data signals which are adjusted in the phase difference.

The forward/reverse switcher 516 receives the input of the clocks from the clock generator 157. If the phase difference designated by the control circuit 150 is 0.25 UI, the forward/reverse switcher 516 performs the forward switching of the input clocks and outputs the clocks to the variable delayer 515. If the phase difference designated by the control circuit 150 is 0.75 UI, the forward/reverse switcher 516 performs the reverse switching of the input clocks.

The clocks are input to the variable delayer 515 from the forward/reverse switcher 516. The variable delayer 515 delays the input clocks by 0.25 UI. The variable delayer 515 outputs the clocks which are delayed by 0.25 UI to the DFF 513.

The DFF 513 receives the input of the data signals with the phase adjusted by the DFF 512. The DFF 513 receives the input of the clocks from the variable delayer 515. The DFF 513 performs retiming of the data signals at the rising edges of the clocks input from the variable delayer 515. In this manner, the DFF 513 performs the phase adjustment to the data signals input from the DFF 512.

Figure 10:
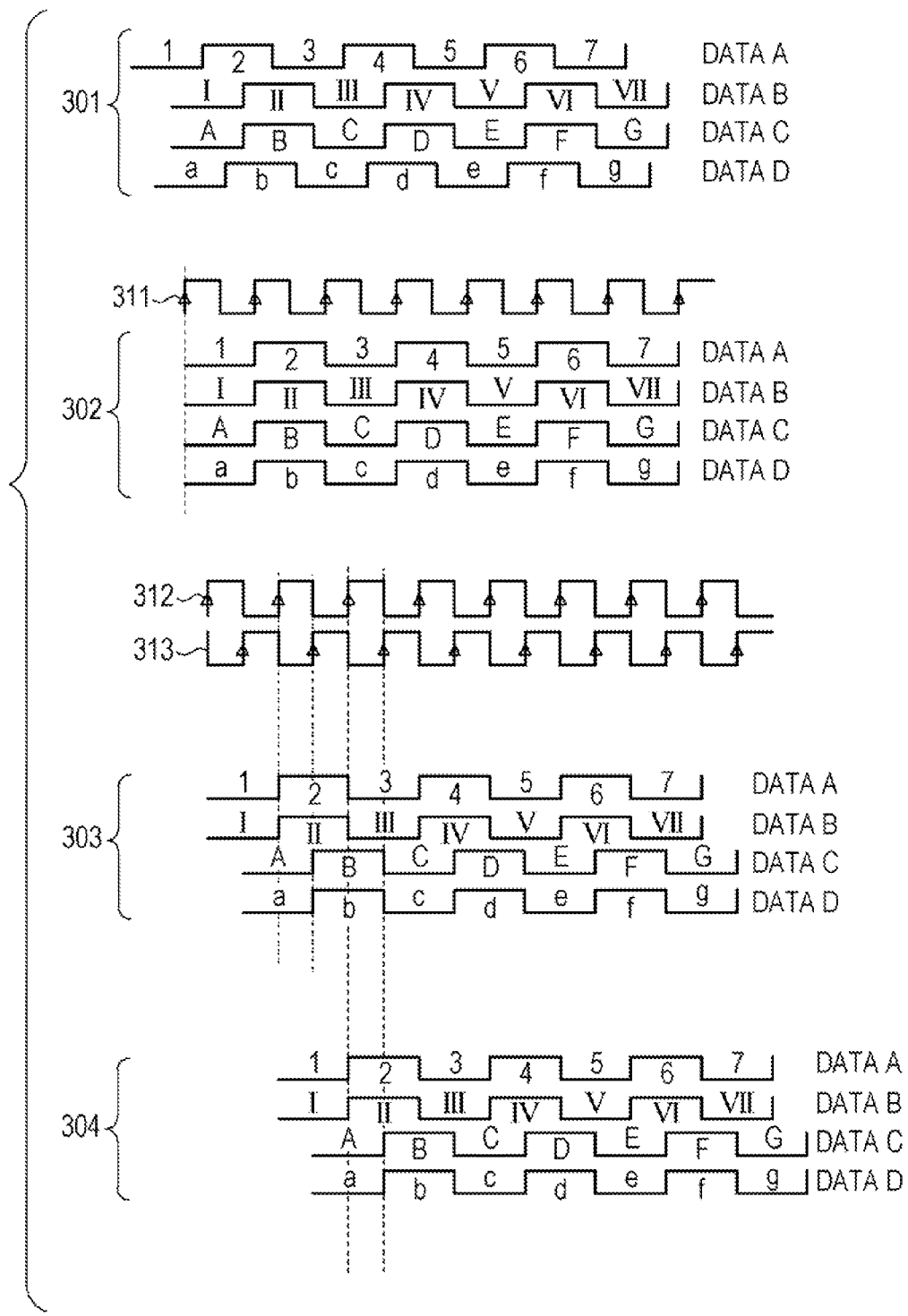
FIG. 10 illustrates a phase adjustment of the data signals for an interleaved state in timing circuits.

Next, with reference to FIG. 10, the phase adjustment of the data signals by timing circuits with the y-polarized wave shifted forward by half a bit will be described. FIG. 10 illustrates a phase adjustment of the data signals for the interleaved state in the timing circuits. In the phase adjustment described here, skew occurs only in the input signals. This means that no skew occurs in the first modulator 11 and the second modulator 12. Thus, the phases are simply in the interleaved state. Here, the skew is a difference in time at which each of the signals reaches (which is similar in the following).

Signal groups 301 to 304 are each constituted by a combination of four data signals. The four data signals represent the data signals input to the first timing circuit 151, the second timing circuit 152, the third timing circuit 153 and the fourth timing circuit 154 in a direction from the top to the bottom of the page of FIG. 10. Here, let the data signals output from the first timing circuit 151 be data A and the data signals output from the second timing circuit 152 be data B. Similarly, let the data signals output from the third timing circuit 153 be data C and the data signals output from the fourth timing circuit 154 be data D. Each data signals has its leading edge at the left end of the page of FIG. 10. For example, the data A is transmitted in the order of 1, 2, 3, 4, 5, 6 and 7. Data signals having rising edges at the same timing are in the same phase. In certain two data signals, if a rising edge of one of the data signals is sifted to the right of the page of FIG. 10 from the rising edge of the other one, the phase of the former one is delayed from that of the latter one.

The signal group 301 represents the data signals at a stage in which they are input to the DFF 511. The signal group 302 represents the data signals at a stage in which their phases are adjusted by the DFF 511. That is, the signal group 302 represents the data signals at a stage in which they are input to the DFF 512. The signal group 303 represents the data signals at a stage in which their phases are adjusted by the DFF 512. That is, the signal group 303 represents the data signals input to the DFF 513.

Here, the DFF 511 represents all the DFFs of the first stage in each of the first timing circuit 151 to the fourth timing circuit 154. The DFF 512 represents all the DFFs of the second stage in each of the first timing circuit 151 to the fourth timing circuit 154. The DFF 513 represents all the DFFs of the third stage in each of the first timing circuit 151 to the fourth timing circuit 154. The forward/reverse switcher 514 represents all the forward/reverse switchers that send clocks to the DFF 512 in each of the first timing circuit 151 to the fourth timing circuit 154. The variable delayer 515 represents all the variable delayers that send clocks to the DFF 513 in each of the first timing circuit 151 to the fourth timing circuit 154. The forward/reverse switcher 516 represents all the forward/reverse switchers that transmit clocks to the variable delayer 515 in each of the first timing circuit 151 to the fourth timing circuit 154. In the following description, the data signals are described collectively for the ease of explanation. Actually, however, the data A is processed in the first timing circuit 151, the data B is processed in the second timing circuit 152, the data C is processed in the third timing circuit 153 and the data D is processed in the fourth timing circuit 154.

In the stage of the signal group 301, the skew occurs which is a difference in time at which each of the data signals reaches. That is, in the stage of the signal group 301 input to the DFF 511, the data A to the data D are in different phase.

The DFF 511 performs retiming of the data A to the data D at the rising edges of the clock 311 input from the clock generator 157. In this manner, the data A to the data D obtain the same phase as represented by the signal groups 302. In this stage, the data A to the data D are in the same phase and thus the data C and the data D are not delayed by half a bit to the data A and the data B.

The forward/reverse switchers 514 of the first timing circuit 151 and the second timing circuit 152 perform the forward switching of the clocks input from the clock generator 157, generate clocks 312 and output the clocks 312 to each DFF 512. The forward/reverse switchers 514 of the third timing circuit 153 and the fourth timing circuit 154 perform reverse switching of the clocks input from the clock generator 157, generate clocks 313 and output the clocks 313 to each DFF 512.

The DFFs 512 of the first timing circuit 151 and the second timing circuit 152 perform retiming of the data A and the data B to the forward clocks 312 input from the clock generator 516. The DFFs 512 of the third timing circuit 153 and the fourth timing circuit 154 perform retiming of the data C and the data D to the reverse clocks 313 input from the forward/reverse switcher 514. Thus, the data C and the data D are delayed by half a bit from the data A and the data B as represented by the signal group 303.

The forward/reverse switchers 516 of the first timing circuit 151 and the second timing circuit 152 perform the forward switching of the clocks input from the clock generator 157 and output the clocks to each variable delayer 515. The forward/reverse switchers 516 of the third timing circuit 153 and the fourth timing circuit 154 perform reverse switching of the clocks input from the clock generator 157 and output the clocks to each variable delayer 515.

The variable delayers 515 of the first timing circuit 151 and the second timing circuit 152 output the clocks 312 input from the forward/reverse switcher 516 directly to the DFF 513. The variable delayers 515 of the third timing circuit 153 and the fourth timing circuit 154 output the clocks 313 input from the forward/reverse switcher 516 directly to the DFF 513.

Each DFF 513 receives, from each DFF 512, the input of the signal group 303 in which the data C and the data D are delayed by half a bit from the data A and the data B. Each DFF 513 receives the input of the clocks from each variable delayer 515. Each DFF 513 performs retiming of the data signals at the rising edges of the input clocks and generates the signal group 304. In particular, the first timing circuit 151 and the second timing circuit 152 perform retiming of the data A and the data B at the rising edges of the clocks 312. The third timing circuit 153 and the fourth timing circuit 154 provide the data C and the data D with the phase difference (delay) of 0.5 UI with respect to the data A and the data B by performing retiming of the data C and the data D at the rising edges of the clocks 313. In this case, the data A to the data D will be in the same phase as that of the signal group 303. Each DFF 513 outputs the phase-adjusted data signals to each amplifier 155.

Here, in the present embodiment, the phase difference of half a bit delay again in the DFF 513. Actually, however, the output from the DFF 512 and the output from the DFF 513 are the signal groups which have the same phase difference. Thus, in this case, the forward/reverse switcher 516 and the variable delayer 515 may not operate and the DFF 513 may output the data signals received from the DFF 512 directly to the amplifier 155. In particular, each DFF 513 receives, from each DFF 512, the input of the signal group 303 in which the data C and the data D are delayed by half a bit from the data A and the data B. Each DFF 513 outputs the input signal group 303 directly to the amplifier 155.

Each DFF 513 receives, from each DFF 512, the input of the signal group 303 in which the data C and the data D are delayed by half a bit from the data A and the data B. Each DFF 513 outputs the input signal group 303 directly to the amplifier 155.

Here, the operation for letting the data C and the data D be delayed by half a bit has been described. When, on the contrary, letting the data A and the data B be delayed by half a bit, it suffices that the operations of the first timing circuit 151 and the second timing circuit 152 and the operations of the third timing circuit 153 and the fourth timing circuit 154 are reversed.

If the data A to the data D are to be in the same phase, i.e., in the aligned state, it suffices that each DFF 512 directly outputs the data signals of the signal group 302 input from each DFF 511.

The amplifier 155 amplifies the data signals input from the first timing circuit 151 to the fourth timing circuit 154 and outputs the data signals. The data signals output from the first timing circuit 151 are used for the phase modulation of one of the optical signals of the first modulator 11. The data signals output from the second timing circuit 152 are used for the phase modulation of the other of the optical signals of the first modulator 11. The data signals output from the third timing circuit 153 are used for the phase modulation of one of the optical signals of the second modulator 12. The data signals output from the fourth timing circuit 154 are used for the phase modulation of the other of the optical signals of the second modulator 12.

For example, when the data signals output from the first timing circuit 151 to the fourth timing circuit 154 are in the same phase, the first modulator 11 and the second modulator 12 modulate the x-polarized wave and the y-polarized wave to be in the same phase, i.e., in the aligned state.

When the data signals output from the third timing circuit 153 and the fourth timing circuit 154 are delayed by half a bit from those output from the first timing circuit 151 and the second timing circuit 152, the second modulator 12 performs the phase modulation of the optical signals such that the optical signals are delayed by half a bit from those of the first modulator 11. The y-polarized wave is thus delayed by 0.5 UI from the x-polarized wave, whereby the x-polarized wave and the y-polarized wave are in the interleaved state with the y-polarized wave being delayed. When, on the contrary, the data signals output from the first timing circuit 151 and the second timing circuit 152 are delayed by half a bit from those output from the third timing circuit 153 and the fourth timing circuit 154, the x-polarized wave and the y-polarized wave are in the interleaved state with the x-polarized wave being delayed.

Figure 11:
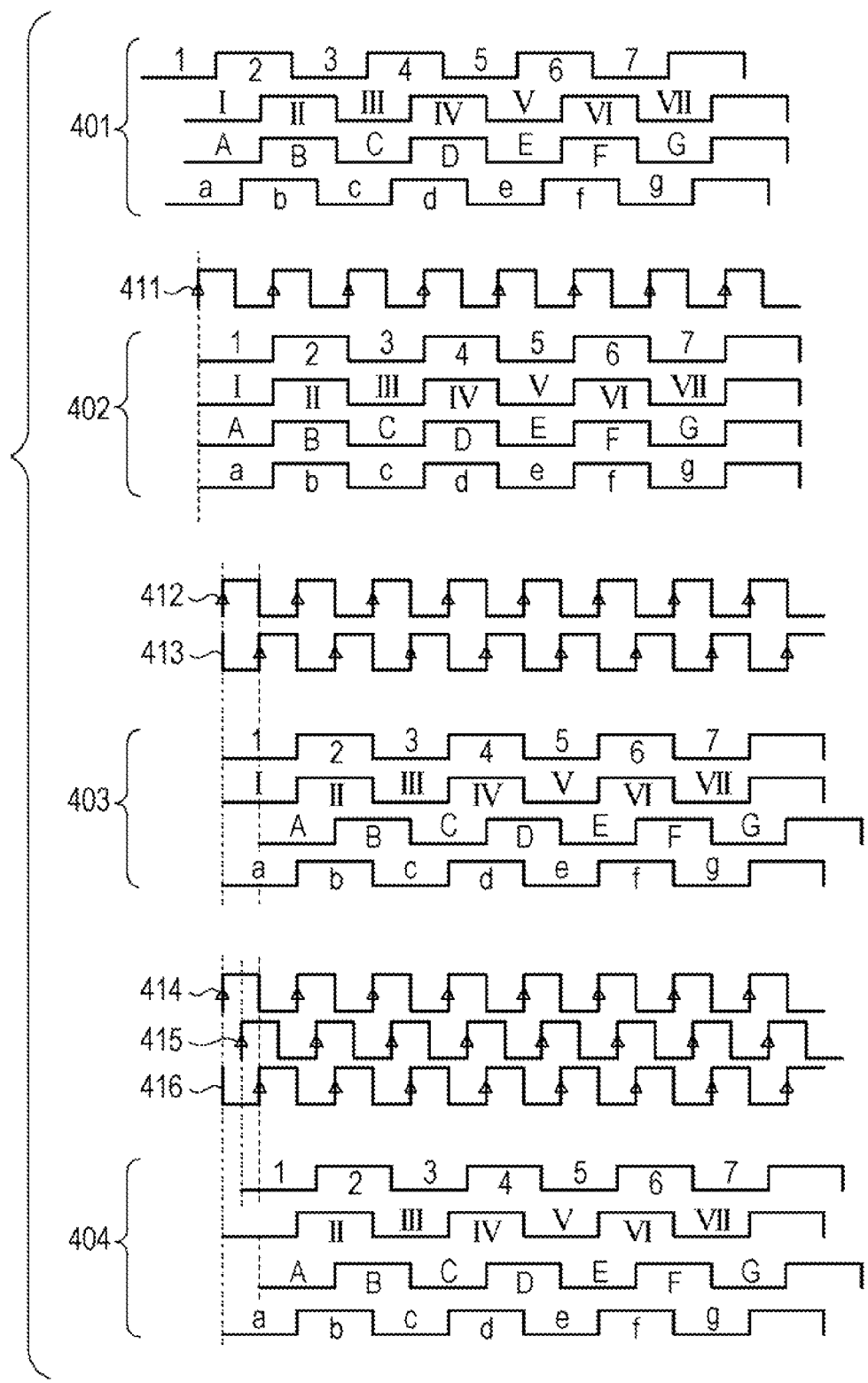
FIG. 11 illustrates a phase adjustment of the data signals for the compensation of the skew in a modulator in the timing circuit.

Next, with reference to FIG. 11, the phase adjustment of the data signals for compensating the skew of the modulators in the timing circuits will be described. A process for adjusting the phase difference will be described. FIG. 11 illustrates a phase adjustment of the data signals for the compensation of the skew in a modulator in the timing circuit. Here, a case in which the data signals are delayed by 0.25 UI in the first timing circuit 151 and delayed by 0.5 UI in the third timing circuit 153 will be described.

Here, the DFF 511, the DFF 512, the DFF 513, the forward/reverse switcher 514, the variable delayer 515 and the forward/reverse switcher 516 collectively represent all the corresponding components disposed in the first timing circuit 151 to the fourth timing circuit 154. The data signals will be described collectively for the ease of explanation. Actually, however, the data A is processed in the first timing circuit 151, the data B is processed in the second timing circuit 152, the data C is processed in the third timing circuit 153 and the data D is processed in the fourth timing circuit 154.

A signal group 401 to a signal group 404 are each constituted by a combination of four data signals. The four data signals represent the data signals input to the first timing circuit 151, the second timing circuit 152, the third timing circuit 153 and the fourth timing circuit 154 in a direction from the top to the bottom of the page of FIG. 10. Here, let the data signals input to the first timing circuit 151 be data A and the data signals input to the second timing circuit 152 be data B. Similarly, let the data signals input to the third timing circuit 153 be data C and the data signals input to the fourth timing circuit 154 be data D. The signal group 401 represents the data signals at a stage in which they are input to the DFF 511. The signal group 402 represents the data signals at a stage in which their phases are adjusted by the DFF 511. That is, the signal group 402 represents the data signals at a stage in which they are input to the DFF 512. The signal group 403 represents the data signals at a stage in which their phases are adjusted by the DFF 512. That is, the signal group 403 represents the data signals input to the DFF 513.

In the stage of the signal group 401, the skew occurs which is a difference in time at which each of the data signals reaches. That is, in the stage of the signal group 401 input to the DFF 511, the data A to the data D are in different phase.

Each DFF 511 performs retiming of the data A to the data D at the rising edges of the clocks 411 input from the clock generator 157. In this manner, the data A to the data D obtain the same phase as represented by the signal groups 402. In this stage, the data A to the data D are in the same phase.

The forward/reverse switchers 514 of the first timing circuit 151, the second timing circuit 152 and the fourth timing circuit 154 perform the forward switching of the clocks input from the clock generator 157, generate clocks 412 and output the clocks 412 to each DFF 512. The forward/reverse switcher 514 of the third timing circuit 153 performs reverse switching of the clocks input from the clock generator 157, generate clocks 413 and output the clocks 413 to the DFF 512.

The DFFs 512 of the first timing circuit 151, the second timing circuit 152 and the fourth timing circuit 154 perform retiming of the data A, the data B and the data C to the forward clocks 412 input from the clock generator 517. The DFF 512 of the third timing circuit 153 performs retiming of the data C to the reverse clocks 413 input from the forward/reverse switcher 514. Thus, the data C is delayed by half a bit from the data A, the data B and the data C as represented by the signal group 403.

The forward/reverse switchers 516 of the first timing circuit 151, the second timing circuit 152 and the fourth timing circuit 154 perform the forward switching of the clocks input from the clock generator 157 and output to each variable delayer 515. The forward/reverse switcher 156 of the third timing circuit 153 performs reverse switching of the clocks input from the clock generator 157 and outputs the clocks to the variable delayer 515.

The variable delayer 515 of the first timing circuit 151 provides the clocks input from the forward/reverse switcher 516 with the phase difference (delay) of 0.25 UI and generates the clocks 415. The variable delayer 515 of the first timing circuit 151 outputs the clocks 415 to the DFF 513. The variable delayers 515 of the second timing circuit 152 and the fourth timing circuit 154 directly output the clocks input from the forward/reverse switcher 516 to each DFF 513. The clocks output from the variable delayers 515 of the second timing circuit 152 and the fourth timing circuit 154 to each DFF 513 are clocks 414. The variable delayer 515 of the third timing circuit 153 outputs the clocks input from the forward/reverse switcher 516 directly to the DFF 513. The clocks output from the variable delayer 515 of the third timing circuit 153 to the DFF 513 are clocks 416.

Each DFF 513 receives, from each DFF 512, the input of the signal group 303 in which the data C is delayed by half a bit to the data A, the data B and the data D. Each DFF 513 receives the input of the clocks from each variable delayer 515. Each DFF 513 performs retiming of the data signals at the rising edges of the input clocks and generates the signal group 404. In particular, the second timing circuit 152 and the fourth timing circuit 154 perform retiming of the data B and the data D at the rising edges of the clocks 414. The first timing circuit 151 provides the data A with the phase difference (delay) of 0.25 UI with respect to the data B and the data D by performing retiming of the data A at the rising edges of the clocks 415. The third timing circuit 153 provides the data C with the phase difference (delay) of 0.5 UI (half a bit) with respect to the data B and the data D by performing retiming of the data C at the rising edges of the clocks 416. Each DFF 513 outputs the phase-adjusted data signals to each amplifier 155.

Here, in the present embodiment, the phase difference (delay) is produced in the DFF 513 by providing the clocks with a delay by the variable delayer 515. However, the phase difference (delay) may alternatively be produced in other methods. For example, the control circuit 150 may store a predetermined voltage in the DFF 513 in advance as a reference voltage and provide the predetermined phase difference when the power of the specific frequency component is higher than the reference voltage.

The amplifier 155 amplifies the data signals input from the first timing circuit 151 to the fourth timing circuit 154 and outputs the data signals. The data signals output from the first timing circuit 151 are used for the phase modulation of one of the optical signals of the first modulator 11. The data signals output from the second timing circuit 152 are used for the phase modulation of the other of the optical signals of the first modulator 11. The data signals output from the third timing circuit 153 are used for the phase modulation of one of the optical signals of the second modulator 12. The data signals output from the fourth timing circuit 154 are used for the phase modulation of the other of the optical signals of the second modulator 12.

For example, a case in which the data A is provided with the phase difference of 0.25 UI with respect to the data B and the data D as represented by the signal group 404 and the data C is provided with the phase difference of 0.5 UI with respect to the data B and the data D will be considered. In this case, one of the optical signals of the first modulator 11 and one of the optical signals of the second modulator 12 are adjusted to be in the same phase. The phase of the other of the optical signals of the first modulator 11 is adjusted to be delayed by 0.25 UI as compared with the one of the optical signals. The phase of the other of the optical signals of the second modulator 12 is adjusted to be delayed by 0.5 UI as compared with the one of the optical signals.

Since the controller 15 controls each of the phases as described above, the skew of the modulator as well as the input skew may be compensated.

Next, a process for the phase adjustment of the optical transmitter 1 according to the second embodiment will be described with reference to FIG. 12. FIG. 12 is a flowchart of a phase adjustment process in an optical transmitter according to the second embodiment.

The controller 15 is provided with a counter. First, the controller 15 sets a value of n of the counter thereof to 1 (n=1) which is the initial value (step S101).

The first modulator 11 and the second modulator 12 respectively receive the input of the x-polarized wave and the y-polarized wave from the optical source 16 via polarization beam splitter 17. The first modulator 11 adjusts the phase of the x-polarized wave under the control of the controller 15. The second modulator 12 adjusts the phase of the x-polarized wave under the control of the controller 15 (step S102). In the present embodiment, it is controlled such that the controller 15 performs no phase adjustment when the optical signals are first subject to the phase adjustment by the first modulator 11 and the second modulator 12.

The multiplexer 13 synthesizes the x-polarized wave input from the first modulator 11 and the y-polarized wave input from the second modulator 12 and generates polarization multiplex signals (step S103).

The phase difference data generator 14 acquires the polarization multiplex signals output from the multiplexer 10. The phase difference data generator 14 converts the polarization multiplex signals into electrical signals with a photodiode 141. The phase difference data generator 14 acquires the power of the specific frequency component using the band pass filter 142 having a predetermined intermediate frequency and a predetermined transmission bandwidth to the polarization multiplex signals converted into the electrical signals. The controller 15 receives the input of the power of the specific frequency component from the phase difference data generator 14. At this time, the controller 15 sets an identifier of the power of the acquired specific frequency component to m(n) (power=m(n)) (step S104).

The controller 15 determines whether n=1 (step S105). If the determination in step S105 is affirmative, the controller 15 controls the first modulator 11 and the second modulator 12 to adjust the phase of the x-polarized wave or the y-polarized wave such that the power of the specific frequency component is smaller than the power of m(n) (step S107).

If, on the other hand, the determination in step S105 is negative, controller 15 determines whether the value of the power of m(n) is larger than the value of the power of m(n−1) (i.e., whether m(n)>m(n−1)) (step S106).

If the determination in step S106 is affirmative, the controller 15 controls the first modulator 11 and the second modulator 12 to adjust the phase of the x-polarized wave or the y-polarized wave such that the power of the specific frequency component is smaller than the power of m(n) (step S107). The controller 15 then increments its own counter, i.e., sets the counter to n=n+1 (step S108). Then, the process returns to step S102.

If, on the other hand, the determination in step S106 is negative, the controller 15 determines whether step S107 and step S110 are repeated alternately twice or more times (step S109). If the determination in step S109 is affirmative, the optical transmitter 1 completes the phase difference adjustment by the feedback control.

If, on the other hand, the determination in step S109 is negative, the controller 15 controls the first modulator 11 and the second modulator 12 to adjust the phase of the x-polarized wave or the y-polarized wave such that the power of the specific frequency component is larger than the power of m(n) (step S110). The controller 15 then increments its own counter, i.e., sets the counter to n=n+1 (step S111). It returns to step S102 after that.

Here, in the description of the present embodiment and the modification, each timing circuit is provided with three DFFs to achieve the three-stage adjustment in order to adjust the phase difference; however, additional DFF(s) may be provided to increase the adjustment stages to achieve more fine control of the phases. In that case, stages for performing the same operations as those of the DFF 513, the variable delayer 515 and the forward/reverse switcher 516 are added.

As described above, the optical transmitter according to the present embodiment may perform the precise phase adjustment of the x-polarized wave and the y-polarized wave by the feedback control using the maximum value and the minimum value of the power of the polarization multiplex signals. Since this feedback control may be used for either of the transmission schemes, i.e., in the aligned state and the interleaved state, the phase difference of the polarized waves included in the polarization multiplex signals may be precisely adjusted in either of the transmission schemes, i.e., in the aligned state and the interleaved state. In addition, switching between the aligned state and the interleaved state may be performed easily.

[Modification]

In the second embodiment, the optical transmitter in which the x-polarized wave and the y-polarized wave are in the aligned or the interleaved state. An optical transmitter 1 according to the modification adjusts the x-polarized wave and the y-polarized wave to have a phase difference between the aligned and the interleaved states, i.e., a phase difference of not smaller than 0 and not greater than 0.5.

Figure 13A:
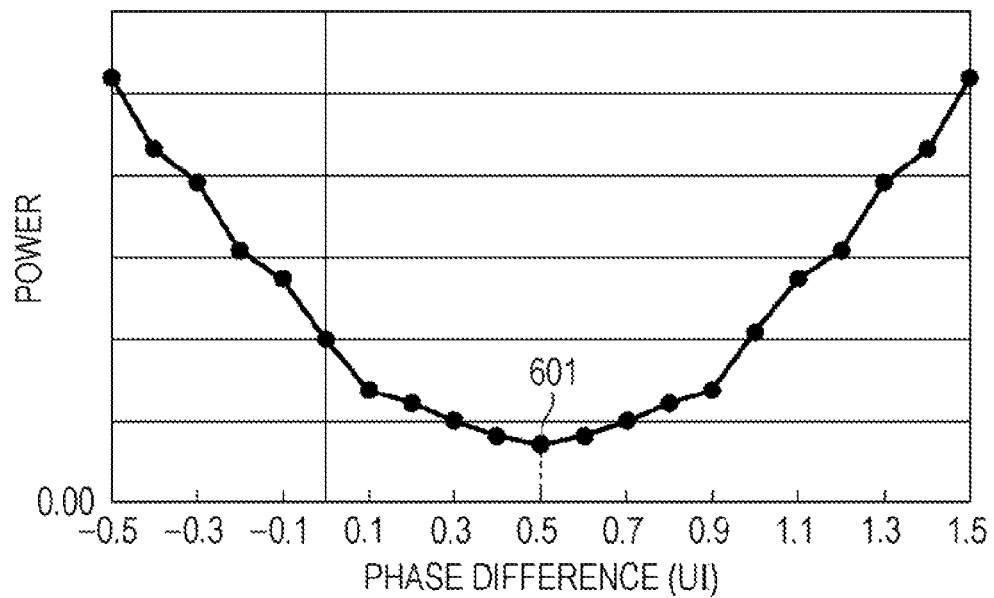
FIG. 13A is a graph illustrating a relationship between the phase difference and the power of the specific frequency when a BPF which is 7 GHz in the center frequency and 21 MHz in the transmission bandwidth is used.
Figure 13B:
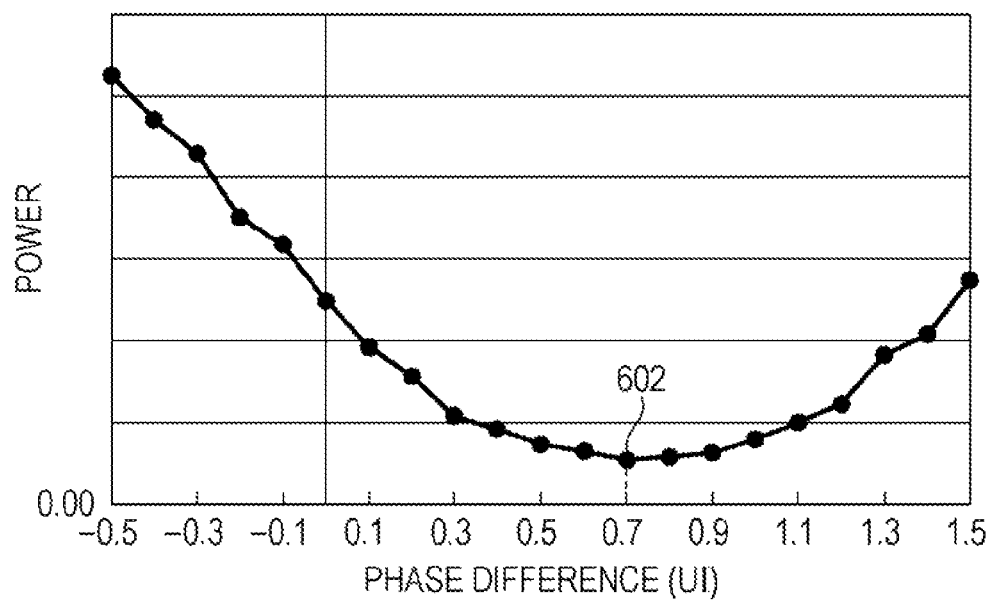
FIG. 13B is a graph illustrating a relationship between the phase difference and the power of the specific frequency when a BPF which is 7 GHz in the center frequency and 105 MHz in the transmission bandwidth is used.

FIG. 13A is a graph illustrating a relationship between the phase difference and the power of the specific frequency when a BPF which is 7 GHz in the center frequency and 21 MHz in the transmission bandwidth is used. FIG. 13B is a graph illustrating a relationship between the phase difference and the power of the specific frequency when a BPF which is 7 GHz in the center frequency and 105 MHz in the transmission bandwidth is used.

If the band pass filter 142 which is 7 GHz in the center frequency and 21 MHz in the transmission bandwidth is used, the power of the specific frequency component becomes the minimum when the phase difference of the x-polarized wave and the y-polarized wave is 0.5 UI as illustrated by a point 601 of FIG. 13A.

If, on the contrary, the band pass filter 142 which is 7 GHz in the center frequency and 105 MHz in the transmission bandwidth is used, the power of the specific frequency component becomes the minimum when the phase difference of the x-polarized wave and the y-polarized wave is 0.7 UI as illustrated by a point 602 of FIG. 13B.

As described above, the phase difference between the x-polarized wave and the y-polarized wave with which the power of the specific frequency component becomes the minimum varies depending on the setting of the transmission bandwidth even if the center frequency is the same. The x-polarized wave and the y-polarized wave may therefore be provided with the predetermined phase difference by the adjustment of the combination of the center frequency and the specific frequency component of the band pass filter 142. Now, an exemplary method for obtaining the predetermined phase difference in the modification will be described. FIG. 14 is a graph illustrating a relationship between the transmission bandwidth and the phase difference when the center frequency is set to 7 GHz.

The band pass filter 142 is the fourth-order Bessel-Thompson filter in the modification. The center frequency of the band pass filter 142 is set to 7 GHz. Under these conditions, the transmission bandwidth is changed to obtain the phase difference between the x-polarized wave and the y-polarized wave with which the power of the specific frequency component becomes the minimum. Here, the relationship between the transmission bandwidth and the phase difference between the x-polarized wave and the y-polarized wave as illustrated in FIG. 14 is achieved. That is, when a band pass filter with the transmission bandwidth smaller than 42 MHz (i.e., the transmission bandwidth at a point 701), the phase difference between the x-polarized wave and the y-polarized wave is 0.5 UI. If the transmission bandwidth is not smaller than 49 MHz (i.e., the transmission bandwidth at a point 702) and not greater than 77 MHz (i.e., the transmission bandwidth at a point 703), the phase difference between the x-polarized wave and the y-polarized wave is 0.6 UI. Here, the relationship is characterized by the stepwise form as illustrated in FIG. 14 since the transmission bandwidth is set on the 7 MHz basis and data is read at the phase difference in the unit of 0.1 UI in the simulation. This means that setting up of the transmission bandwidth more finely and setting up of the phase difference in smaller units allow the graph illustrating a relationship between the transmission bandwidth and the phase difference becomes smoother.

Then, the transmission bandwidth of the band pass filter 142 with which the predetermined phase difference is obtained is determined using the graph of FIG. 14. In the optical transmitter 1 according to the modification, the band pass filter 142 which is 7 GHz in the center frequency and has the determined transmission bandwidth is used. The optical transmitter 1 adjusts the phase between the x-polarized wave and the y-polarized wave by the feedback control described in the second embodiment such that the power of the specific frequency component of the polarization multiplex signals becomes the minimum. The optical transmitter 1 according to the modification then outputs the polarization multiplex signals obtained by the synthesis of the x-polarized wave and the y-polarized wave with the predetermined phase difference.

In the modification, the center frequency is fixed to 7 GHz and the transmission bandwidth is determined to obtain the predetermined phase difference; actually, however, the center frequency may be set to any value. In the modification, the combination of the center frequency and the transmission bandwidth with which the power of the specific frequency component becomes the minimum is used; however, the combination of the center frequency and the transmission bandwidth with which the power of the specific frequency component becomes the maximum may also be used. That is, when the band pass filter 142 with the combination of the center frequency and the transmission bandwidth with which the power of the specific frequency component becomes the minimum or the maximum, the optical transmitter which outputs the polarization multiplex signals of the x-polarized wave and the y-polarized wave having the predetermined phase difference is achieved.

As described above, the optical transmitter according to the modification may output the polarization multiplex signals obtained by the synthesis of the x-polarized wave and the y-polarized wave having the predetermined phase difference. In this regard, in some cases, providing the phase difference between the aligned and the interleaved states depending on the distance and the width of the cable between the x-polarized wave and the y-polarized wave allows effective prevention of attenuation in the signal strength during the optical transmission. In such a case, use of the optical transmitter according to the modification allows generation of the polarization multiplex signals obtained by the synthesis of the x-polarized wave and the y-polarized wave having the phase difference which is the most suitable for the environment.

Third Embodiment

Figure 15:
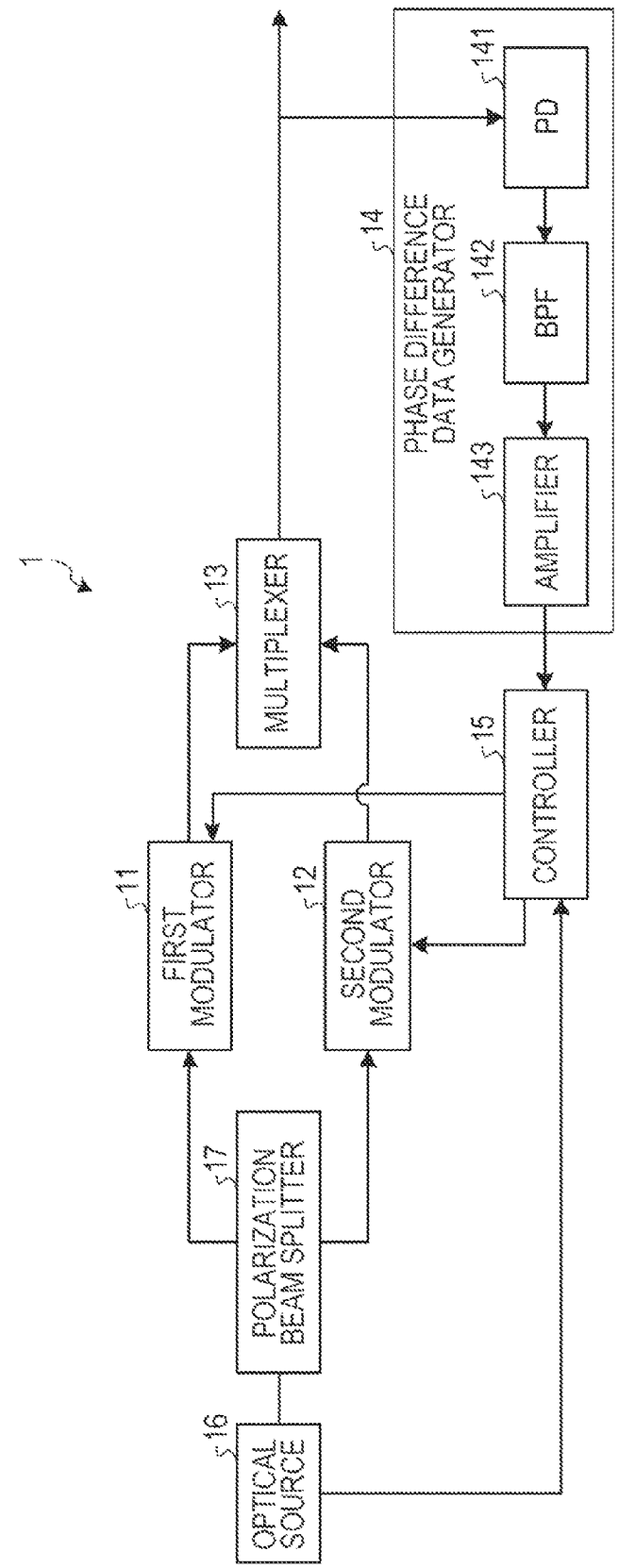
FIG. 15 is a block diagram of an optical transmitter according to a third embodiment.

FIG. 15 is a block diagram of an optical transmitter according to a third embodiment. An optical transmitter 1 according to the present embodiment differs from the second embodiment in that the feedback control of the phase difference is performed with consideration given to the fluctuations of the output power of an optical source 16. Thus, the control with consideration given to the fluctuations of the output power of the optical source 16 will be mainly described. Here, components in FIG. 15 denoted by the same reference numerals as those in FIG. 3 are the same in function unless otherwise stated.

The optical source 16 outputs light to a polarization beam splitter 17. The optical source 16 then outputs the optical output power of the light output to the polarization beam splitter 17 to a controller 15.

The controller 15 receives the input of the power of the specific frequency component from a phase difference data generator 14. The controller 15 then receives the optical output power from the optical source 16.

The controller 15 obtains a difference in the optical output power under the previous feedback control and the optical output power input from the optical source 16. The controller 15 also obtains a difference in the power of the specific frequency component under the previous feedback control and the power of the specific frequency component input from the phase difference data generator 14. The controller 15 calculates a ratio between the difference in the optical output power and the difference in the power of the specific frequency component.

If the ratio between the difference in the optical output power and the difference in the power of the specific frequency component is 1, the controller 15 determines that the power of the input specific frequency component is the same as that of the power of the specific frequency component under the previous feedback control. In that case, the controller 15 performs the control to the first modulator 11 and the second modulator 12 using the same parameter as those in the previous feedback control.

If, on the other hand, the ratio between the difference in the optical output power and the difference in the power of the specific frequency component is other than 1, the controller 15 determines that the power of the input specific frequency component is not the same as that of the power of the specific frequency component under the previous feedback control. In that case, the controller 15 controls the first modulator 11 and the second modulator 12 to provide the x-polarized wave and the y-polarized wave with the phase difference which is different from the phase difference between the x-polarized wave and the y-polarized wave under the previous control.

As described above, the optical transmitter according to the present embodiment determines whether the drift of the power of the specific frequency component occurs due to the drift of the optical output power of the optical source. If the drift of the power of the specific frequency component occurs not only due to the drift of the optical output power, the optical transmitter performs the feedback control. Thus, the fluctuations of the power of the specific frequency component under the influence of the fluctuations of the optical output power of the optical source may be excluded in the feedback control and the feedback control may therefore be performed more precisely.

In this regard, the optical output power of the light output from the optical source is subject to fluctuations due to surrounding environments (e.g., aging degradation and temperature change). Even if such fluctuations of the optical output power in the optical source occur, the optical transmitter according to the present embodiment may perform the feedback control precisely.

Fourth Embodiment

Figure 16:
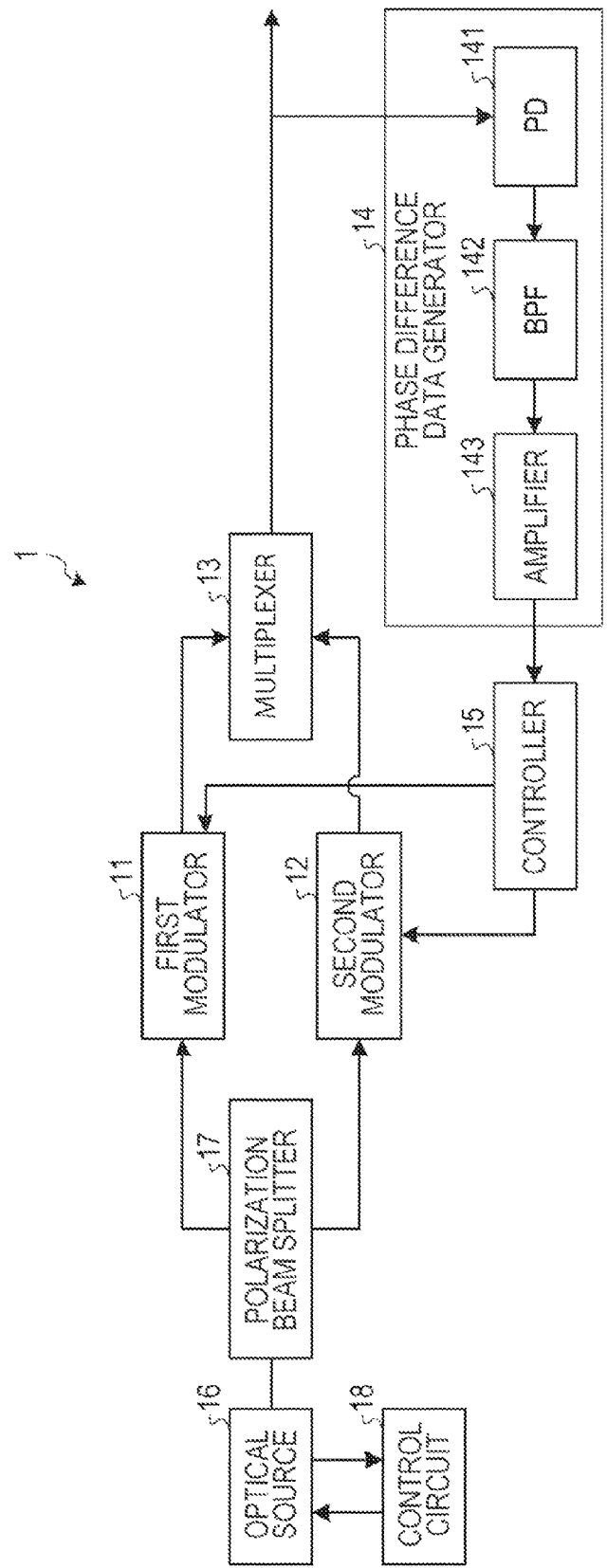
FIG. 16 is a block diagram of an optical transmitter according to a fourth embodiment.
Figure 17:
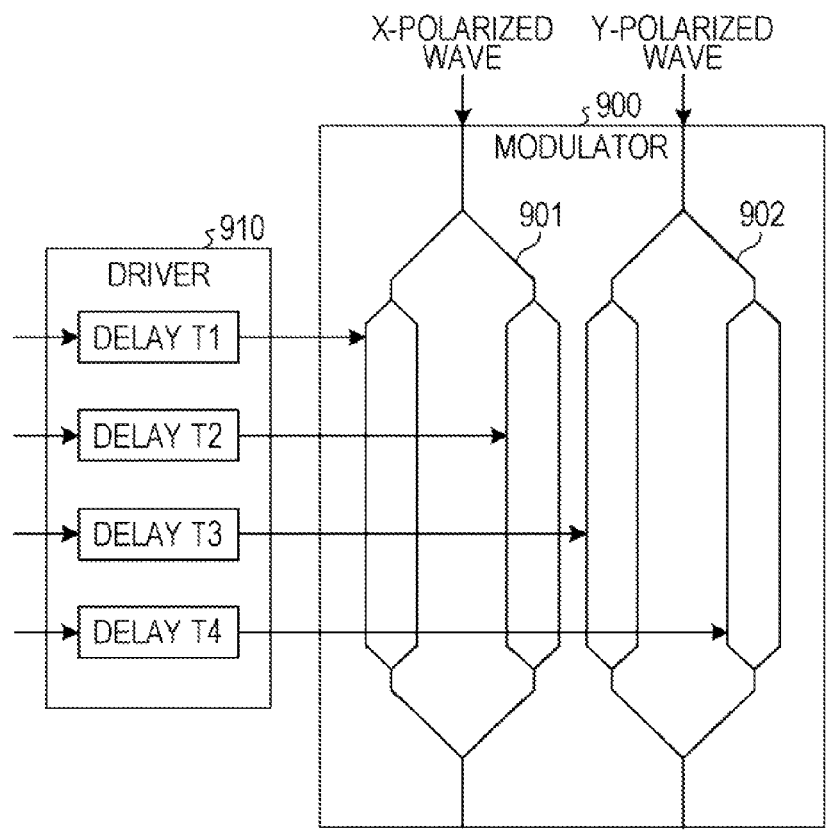
FIG. 17 illustrates a related art QPSK transmitter.
Figure 18:
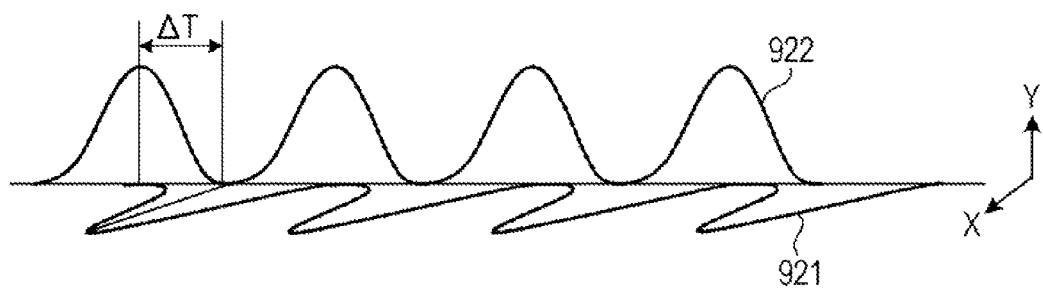
FIG. 18 illustrates the phase difference between an x-polarized wave and a y-polarized wave.

FIG. 16 is a block diagram of an optical transmitter according to a fourth embodiment. An optical transmitter 1 according to the present embodiment is the same as that of the third embodiment in that the feedback control of the phase difference is performed with consideration given to the fluctuations of the output power of an optical source 16. The optical transmitter 1 according to the present embodiment, however, differs from that of the third embodiment in that the fluctuations of the optical output power of the optical source are suppressed in the optical source 16 itself. Thus, the control of the fluctuations of the optical output power in the optical source 16 will be mainly described. Here, components in FIG. 16 denoted by the same reference numerals as those in FIG. 3 are the same in function unless otherwise stated.

As illustrated in FIG. 16, the optical transmitter 1 according to the present embodiment is the same as the optical transmitter 1 of the second embodiment except for an optical source control circuit 18 added thereto.

The optical source 16 outputs, to the optical source control circuit 18, the optical output power of the light which tends to be output to a polarization beam splitter 17. The optical source 16 adjusts the optical output power of the light under the control of the optical source control circuit 18. The optical source 16 outputs the adjusted light to the polarization beam splitter 17.

The optical source control circuit 18 receives the input of the optical output power from the optical source 16. The optical source control circuit 18 then controls such that the optical output power of the light output from the optical source 16 is fixed using the optical output power input from the optical source 16. For example, the control circuit 150 performs auto power control (APC).

As described above, the optical transmitter according to the present embodiment lets the optical output power of the light output from the optical source be constant. Thus, the fluctuations of the power of the specific frequency component under the influence of the fluctuations of the optical output power of the optical source may be excluded in the feedback control and the feedback control may therefore be performed more precisely.

The third embodiment and the fourth embodiment may be used in combination, which allows even more precise feedback control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An optical transmitter comprising:
a first modulator that modulates a first optical signal with a first data signal;
a second modulator that modulates a second optical signal with a second data signal;
a multiplexer that multiplexes the modulated first optical signal and the modulated second optical signal to output a multiplexed signal;
a phase difference data generator that generates a phase difference signal corresponding to a phase difference between the modulated first optical signal and the modulated second optical signal from the multiplexed signal;
a controller that controls the phase difference between the modulated first optical signal and the modulated second optical signal based on the phase difference signal; and
an optical source that produces a light and outputs the produced light to the first and second modulators, wherein
the controller calculates a ratio between a rate of change in an optical output power and a rate of a change in a power of a specific frequency component, and adjusts phase of the first and second optical signals in the first and second modulators based on the phase difference data, if the ratio is other than 1.

2. The optical transmitter according to claim 1, wherein the first optical signal and the second optical signal are two optical waves with mutually orthogonal polarization states.

3. The optical transmitter according to claim 1, wherein the phase difference signal generator includes:
a photo detector that converts the multiplexed signal into an electrical signal, and
a filter that extracts the specific frequency component from the electrical signal as the phase difference signal.

4. The optical transmitter according to claim 3, wherein the filter is a band pass filter that has a center frequency, and when a transmission rate of the modulated first and second optical signals is N baud/second, the center frequency is set to N/n Hz(n=1,2,4 or 8).

5. The optical transmitter according to claim 3, wherein the controller controls the phase difference between the modulated first optical signal and the modulated second optical signal so that the specific frequency component from the electrical signal comes near maximum or minimum.

6. The optical transmitter according to claim 4, wherein when the transmission rate of the modulated first and second optical signals are N baud/second, and the center frequency of the filter is set to N Hz, the controller controls the phase difference between the modulated first optical signal and the modulated second optical signal so that the specific frequency component from the electrical signal comes near maximum to reduce the phase difference, or the controller controls the phase difference between the modulated first optical signal and the modulated second optical signal so that the specific frequency component from the electrical signal comes near minimum to make the phase difference come near 180 degrees.

7. The optical transmitter according to claim 4, wherein when the transmission rate of the modulated first and second optical signals are N baud/second, and the center frequency of the filter is set to N/2 Hz, the controller controls the phase difference between the modulated first optical signal and the modulated second optical signal so that the specific frequency component from the electrical signal comes near maximum to reduce the phase difference.

8. The optical transmitter according to claim 4, wherein when the transmission rate of the modulated first and second optical signals are N baud/second, and the center frequency of the filter is set to N/4 Hz, the controller controls the phase difference between the modulated first optical signal and the modulated second optical signal so that the specific frequency component from the electrical signal comes near minimum to make the phase difference come near 180 degrees.

9. The optical transmitter according to claim 4, wherein when the transmission rate of the modulated first and second optical signals are N baud/second, and the predetermined center frequency of the filter is set to N/8 Hz, the controller controls the phase difference between the modulated first optical signal and the modulated second optical signal so that the specific frequency component from the electrical signal comes near maximum to make the phase difference come near 180 degrees.

10. The optical transmitter according to claim 3, wherein the phase difference data generator further includes an amplifier that amplifies the power of the specific frequency component received from the filter.

11. The optical transmitter according to claim 1, further comprising:

an optical source control circuit that controls such that the optical output power of the light output from the optical source is fixed.

12. The optical transmitter according to claim 1, wherein the controller includes:

a plurality of D-type flip flops that delays data signals for phase-adjusting of the first and second modulators, and a variable delayer that produces a delay in input clocks of the D-type flip flops.

13. The optical transmitter according to claim 1, wherein the controller includes a plurality of D-type flip flops that delays data signals for phase-adjusting of the first and second modulators, and the plurality of D-type flip flops produce a delay in the data signals when the power of the specific frequency component is higher than a predetermined reference voltage.

14. A method of controlling an optical transmitter, comprising:

producing a light and outputting the produced light to a first modulator and a second modulator;

multiplexing a first optical signal output from the first modulator and the second optical signal output from a second modulator to output a multiplexed signal;

generating phase difference data corresponding to the phase difference between the modulated first optical signal and the modulated second optical signal from the multiplexed signal;

controlling a phase difference between the modulated first signal and the modulated second optical signal based on the phase difference data;

calculating a ratio between a rate of change in an optical output power and a rate of a change in a power of a specific frequency component; and adjusting phase of the first and second optical signals in the first and second modulators based on the phase difference data, when the ratio is other than 1.

* * * * *